US012239581B2

(12) United States Patent
Moseley et al.

(10) Patent No.: US 12,239,581 B2
(45) Date of Patent: Mar. 4, 2025

(54) PATIENT TRANSPORT APPARATUS

(71) Applicant: University of Johannesburg, Johannesburg (ZA)

(72) Inventors: Ashton Margarete Moseley, Johannesburg (ZA); Dominic White, Johannesburg (ZA)

(73) Assignee: University of Johannesburg, Johannesburg (ZA)

( * ) Notice: Subject to any disclaimer, the term of this patent is extended or adjusted under 35 U.S.C. 154(b) by 0 days.

(21) Appl. No.: 18/017,283

(22) PCT Filed: Jul. 21, 2021

(86) PCT No.: PCT/IB2021/056589
§ 371 (c)(1),
(2) Date: Jan. 20, 2023

(87) PCT Pub. No.: WO2022/018657
PCT Pub. Date: Jan. 27, 2022

(65) Prior Publication Data

US 2023/0293364 A1 Sep. 21, 2023

(30) Foreign Application Priority Data

Jul. 21, 2020 (ZA) ................................ 2020/04481

(51) Int. Cl.
*A61G 1/017* (2006.01)
*A61G 1/013* (2006.01)
(Continued)

(52) U.S. Cl.
CPC ............... *A61G 1/017* (2013.01); *A61G 1/04* (2013.01); *A61G 5/061* (2013.01); *A61G 5/066* (2013.01); *A61G 1/013* (2013.01)

(58) Field of Classification Search
CPC .......... A61G 1/017; A61G 1/013; A61G 1/00; A61G 1/04; A61G 5/061; A61G 5/066; A61G 7/002; A61G 7/015; A61G 13/08
(Continued)

(56) References Cited

U.S. PATENT DOCUMENTS 6,561,524 B1 * 5/2003 Medina .................. A61G 5/061 280/5.22
6,648,343 B2 * 11/2003 Way ....................... A61G 5/061 280/5.22
(Continued)

FOREIGN PATENT DOCUMENTS

CN 103462750 12/2013
WO WO-2022018657 A1 * 1/2022 ............. A61G 1/017

OTHER PUBLICATIONS

Written Opinion based on International Application No. PCT/IB2021/056589, dated Jan. 27, 2022, pp. 1-5.
(Continued)

*Primary Examiner* — Robert G Santos
(74) *Attorney, Agent, or Firm* — McCarter & English, LLP

(57) ABSTRACT

A patient transport apparatus (100, 10) which is configurable in at least three modes of operation, according to specific operational requirements. The apparatus (100, 10) comprises a patient support assembly 12 and at least a first and second wheel arrangement (14, 16). The patient support assembly 12 comprises a main portion 12.1, and a first and second portion (12.2, 12.3) extending from opposite sides of the main portion 12.1. The first and second portions (12.2, 12.3) are independently adjustable relative to the main portion 12.1. The first and second wheel arrangements (14, 16) are independently adjustable relative to the patient support assembly 12. The patient transport apparatus (100, 10) is configurable as a stretcher, as a chair (or wheelchair) and as
(Continued)

a stair chair, by relative adjustment of the patient support assembly 12 and the first and second wheel arrangements (14, 16).

20 Claims, 18 Drawing Sheets

(51) Int. Cl.
*A61G 1/04* (2006.01)
*A61G 5/06* (2006.01)

(58) Field of Classification Search
USPC .......... 5/626, 627, 625, 613, 617, 618, 86.1, 5/81.1 R; 296/20
See application file for complete search history.

(56) References Cited

U.S. PATENT DOCUMENTS

| | | | | |
|---|---|---|---|---|
| 7,125,022 | B2 * | 10/2006 | Medina | A61G 5/0833<br>280/5.22 |
| 7,950,673 | B2 * | 5/2011 | Reed | A61G 5/066<br>297/344.21 |
| 8,307,473 | B1 * | 11/2012 | Lambarth | A61G 5/061<br>5/81.1 R |
| 8,640,798 | B2 * | 2/2014 | Walkingshaw | A61G 5/066<br>280/5.24 |
| 9,004,204 | B2 * | 4/2015 | Walkingshaw | A61G 5/061<br>280/5.24 |
| 9,486,373 | B2 * | 11/2016 | Lambarth | A61G 5/066 |
| 10,744,049 | B2 * | 8/2020 | Naber | A61G 5/066 |
| 10,758,437 | B2 * | 9/2020 | Lucas | A61G 5/066 |
| 10,857,047 | B2 * | 12/2020 | Furman | A61G 5/061 |
| 11,020,293 | B2 * | 6/2021 | Stryker | A61G 5/066 |
| 11,304,865 | B2 * | 4/2022 | Furman | A61G 7/08 |
| 11,369,531 | B2 * | 6/2022 | Furman | A61G 5/061 |
| 11,464,688 | B2 * | 10/2022 | Naber | A61G 5/066 |
| 11,679,045 | B2 * | 6/2023 | Schaberg | A61G 5/0891<br>280/250.1 |
| 11,696,860 | B2 * | 7/2023 | Pfeiffer | A61G 5/0883<br>280/29 |
| 11,938,067 | B2 * | 3/2024 | Brosnan | A61G 5/066 |
| 11,938,068 | B2 * | 3/2024 | Wallace | A61G 5/1032 |
| 11,951,052 | B2 * | 4/2024 | Lucas | A61G 5/04 |
| 11,963,916 | B2 * | 4/2024 | Tessmer | A61G 5/061 |
| 12,109,156 | B2 * | 10/2024 | Furman | A61G 5/066 |
| 12,115,111 | B2 * | 10/2024 | Schaberg | A61G 5/1032 |
| 2003/0132585 | A1 | 7/2003 | Way et al. | |
| 2003/0141677 | A1 * | 7/2003 | Medina | A61G 5/08<br>280/5.24 |
| 2009/0230638 | A1 * | 9/2009 | Reed | A61G 5/0891<br>297/344.22 |
| 2010/0117312 | A1 * | 5/2010 | Walkingshaw | A61G 5/066<br>305/15 |
| 2014/0090914 | A1 * | 4/2014 | Walkingshaw | A61G 5/066<br>180/190 |
| 2014/0259420 | A1 | 9/2014 | Lambarth et al. | |
| 2018/0028377 | A1 | 2/2018 | Stryker et al. | |
| 2018/0177652 | A1 * | 6/2018 | Furman | A61G 7/1073 |
| 2018/0185212 | A1 * | 7/2018 | Lucas | A61G 5/061 |
| 2018/0185213 | A1 * | 7/2018 | Naber | A61G 5/066 |
| 2018/0369036 | A1 | 12/2018 | Furman et al. | |
| 2020/0345566 | A1 * | 11/2020 | Naber | A61G 5/066 |
| 2020/0345567 | A1 * | 11/2020 | Lucas | A61G 5/061 |
| 2021/0045946 | A1 * | 2/2021 | Furman | A61G 5/061 |
| 2021/0196535 | A1 * | 7/2021 | Brosnan | A61G 5/061 |
| 2021/0196536 | A1 * | 7/2021 | Tessmer | A61G 5/066 |
| 2021/0196537 | A1 * | 7/2021 | Schaberg | A61G 5/128 |
| 2021/0196538 | A1 * | 7/2021 | Pfeiffer | A61G 5/0883 |
| 2021/0196539 | A1 * | 7/2021 | Wallace | A61G 5/0833 |
| 2022/0241123 | A1 * | 8/2022 | Furman | A61G 5/066 |
| 2023/0277393 | A1 * | 9/2023 | Schaberg | A61G 5/0833<br>280/250.1 |
| 2023/0293364 | A1 * | 9/2023 | Moseley | A61G 1/04<br>5/626 |

OTHER PUBLICATIONS

International Search Report based on International Application No. PCT/IB2021/056589, dated Jan. 27, 2022, pp. 1-4.

International Preliminary Report on Patentability based on International Application No. PCT/IB2021/056589, dated Feb. 2, 2023, pp. 1-6.

* cited by examiner

PATIENT TRANSPORT APPARATUS

BACKGROUND TO THE INVENTION

This invention relates to a patient transport apparatus, and in particular to a patient transport apparatus that can be configured in various modes of operation, according to specific operational requirements.

The use of wheelchairs, stair chairs and stretchers to support and/or transport patients, is well known. The selection of a type of transportation apparatus is often made based on the physical condition of the patient (in other words, the type and severity of injuries of a patient) and the transportation needs of the patient (such as whether an ambulance will be used, whether stairs have to be scaled, whether the patient needs to be transported over uneven terrain or confined spaces, and the like).

Various requirements need to be met, based on the specific transportation needs of the patient. For instance, when transported via ambulance, a patient transport apparatus needs to incorporate patient restraint features, foot and arm rests and the like. Wheels of the apparatus need to be foldable to facilitate loading of the apparatus into the ambulance. Furthermore, equipment carrying features, such as fittings for carrying oxygen equipment and an IV hook, need to be included.

In cases where the patient needs to be transported along a staircase, a surface supporting the patient needs to be angularly adjustable relative to wheels/tracks of the transport device.

In other cases, especially in cases where the patient suffers with respiratory issues, the patient needs to be kept in a so-called “Fowler’s position”. The Fowler’s position is a standard position, in which a patient is seated in a semi-sitting position with knees either bent or straight. This position promotes chest expansion while minimizing gravitational pressure on the chest region of the patient.

In some cases, mobility and agility are important, such as when transporting a patient around tight corners and through corridors. In such cases, a transport apparatus needs to be foldable. This also aids when the apparatus needs to be transported in a vehicle, such as an ambulance. When it comes to emergency medical services (“EMS”), it should be noted that ambulances are specifically adapted to transport patients supported by a stretcher. Ambulances are specifically adapted to secure such stretchers in place during transportation. Therefore, if the patient is transported to the ambulance by way of an apparatus other than a stretcher, such as a wheelchair, the patient needs to be transferred to a stretcher before the patient can be transported by way of the ambulance. This is time consuming, and, in cases where the injuries of the patient are severe, may be cause further injury to the patient.

Even though some solutions to some of the requirements set out above have been proposed in isolation, a need still exists for a transportation apparatus that provides a solution that, at least to a degree, addresses all of the needs at once. Therefore, in order to meet such needs, the transport apparatus needs to be adjustable between various configurations, whilst being lightweight. A need also exists for a low-cost transport apparatus.

It is accordingly an object of the invention to provide a patient transport apparatus that will, at least partially, address the above disadvantages.

It is also an object of the invention to provide a patient transport apparatus which will be a useful alternative to existing transport apparatuses.

SUMMARY OF THE INVENTION

In accordance with a first aspect of the invention there is provided a patient transport apparatus comprising:

- a patient support assembly, comprising a main portion, and a first and second portion extending from opposite sides of the main portion, which first and second portions are independently adjustable relative to the main portion;
- at least a first and second wheel arrangement which are adjustable, and in some cases independently adjustable, relative to the patient support assembly,
- wherein patient transport apparatus may be configured in at least a first, second and third configuration, by adjustment of at least some of the first portion, the second portion, the first wheel arrangement and the second wheel arrangement.

Furthermore, the patient transport apparatus may be configured: i) as a stretcher when configured in the first configuration; ii) as a chair when configured in the second configuration; and iii) as a stair chair when configured in the third configuration.

The patient transport apparatus may be adapted as an emergency medical services (EMS) transport apparatus.

When the patient transportation apparatus is configured in the first configuration, the main portion and first and second portions of the patient support assembly may be substantially aligned and supported by the first and second wheel arrangements in a substantially horizontal orientation. A substantially horizontal orientation will be taken to include an orientation which is substantially parallel to a surface on which the apparatus is supported, even though not horizontal. A vertical orientation may be perpendicular to a substantially horizontal orientation.

When the patient transportation apparatus is configured in the second configuration, the first and second portions may be pivoted relative to the main portion of the patient support assembly, which main support portion may be supported by the first and second wheel arrangements in a substantially horizontal orientation. The first portion may be pivoted downward, and the second portion may be pivoted upward.

The patient transport apparatus may further include at least a first, but typically also a second, stair engagement device which may operatively be configured in a position to engage a stair, when the patient transport apparatus is configured in the third configuration.

The first stair engagement device may be fitted to a stair engagement subframe, which in turn, may be fitted to the second wheel arrangement. The second wheel arrangement may include a second wheel subframe, and the stair engagement subframe may be pivotably fixed to a bottom portion of the second wheel subframe. The stair engagement subframe may pivotably be displaceable between a folded configuration and an operative configuration.

The stair engagement subframe may be disposed at an angle of about 35 degrees from vertical, when in the operative configuration.

The apparatus may furthermore comprise a brace which may extend between the second wheel subframe and the stair engagement subframe when the stair engagement subframe is configured in the operative configuration. The brace may be provided for supporting the stair engagement subframe in the operative configuration.

A part of the brace may be received within a slot formed on the stair engagement subframe. The brace may bias the stair engagement subframe towards the operative configuration.

A torsion spring located between the brace and the second wheel subframe may be provided to cause the brace to bias the stair engagement subframe towards the operative configuration.

A retaining mechanism may be provided for releasably retaining the brace when the stair engagement subframe is in the folded configuration, thereby retaining the stair engagement subframe in the folded configuration (against the bias).

The first portion of the patient support assembly may pivotably be displaceable from about 80 degrees below a level of the main portion of the patient support assembly, to about 15 degrees above the level of the patient support assembly.

The second portion of the patient support assembly may pivotably be displaceable from a level of the main portion of the patient support assembly, to about 90 degrees above the level of the patient support assembly.

The second portion of the patient support assembly may be locked at about 65 degrees above a level of the main portion of the patient support assembly. The first portion may be pivoted downward between 65 and 80 degrees relative to the main portion when the patient transport apparatus is configured in the third configuration.

The first portion may be pivoted downward by between 65 and 80 degrees relative to a level of the main portion of the patient support assembly, and the second portion may be pivoted upward by between 65 degrees and 90 degrees relative to the level of the main portion of the patient support assembly, when the patient transport apparatus is configured in the second configuration.

The first wheel arrangement, when locked in position by the respective locking arrangement, may be locked at an angle of between 60 and 80 degrees relative to a surface on which the apparatus is supported, and may therefore slant forwards. The second wheel arrangement may be locked at an angle of between 60 and 80 degrees relative to a surface on which the apparatus is supported, and may therefore slant backwards. The slanting of the first and second wheel arrangements may lend stability to the apparatus.

In an alternative arrangement, when the patient transportation apparatus is configured in the third configuration, at least one of the first and second wheel arrangements may be displaced relative to the main portion of the patient support assembly, thereby to support the main portion of the patient support assembly in a substantially horizontal position when the patient transport apparatus is situated on a flight of stairs.

The first and second support portions of the patient support assembly may be pivoted relative to the main support assembly, when the patient transport apparatus is configured in the second and/or third configurations.

The patient transportation apparatus may be configurable in a fourth configuration, in which the second portion of the patient support assembly is pivoted upward relative to the main portion of the patient support assembly, while the first portion of the patient support assembly is provided substantially aligned with the main portion of the patient support assembly or pivoted slightly upward (typically around 15 degrees upward) relative to the main portion of the patient support assembly. When the patient transport apparatus is supported in the fourth configuration, the patient may be supported in a Fowler's position.

The patient transport apparatus may comprise a first locking mechanism to lock the first portion of the patient support assembly relative to the main portion of the patient support assembly, and a second lock mechanism to lock the second portion of the patient support assembly relative to the main portion of the patient support assembly.

The first wheel arrangement may be pivotably fixed relative to the patient support assembly. The first wheel arrangement may comprise a first wheel sub-frame and a first set of wheels. The first wheel sub-frame may comprise a first wheel sub-frame locking mechanism, for fixing a position of the first wheel sub-frame relative to the patient support assembly. The first set of wheels may comprise a first and second castor. At least one of the first and second castors may comprise a castor lock mechanism with which the specific castor may be locked in position.

The second wheel arrangement may be pivotably fixed relative to the patient support assembly. The second wheel arrangement may comprise a second wheel sub-frame and a second set of wheels. The second wheel sub-frame may comprise a second wheel sub-frame locking mechanism, for fixing a position of the second wheel sub-frame relative to the patient support assembly or may be interconnected with the first wheel subframe. The second set of wheels may comprise a third and fourth castor. At least one of the third and fourth castors may comprise a castor lock mechanism with which the specific castor may be locked in position.

The main portion and first and second portions of the patient support assembly may include a main support sub-frame, first support sub-frame and second sub-frame, respectively.

The first and second wheel sub-frames may both be pivotably fixed to the main support sub-frame.

The second wheel sub-frame may comprise a stair engagement device. The stair engagement device may be mounted to the second wheel sub-frame.

The stair engagement device may comprise a first and second contact surface which, in use, may be provided for engaging an edge of a stair, when the patient transport apparatus is in the third configuration. The first and second contact surfaces may be formed by an endless belt or track. Each of the first and second contact surfaces may be supported by a first and second pulley.

The first wheel arrangement may be displaceable between a folded configuration and an unfolded configuration.

The second wheel arrangement may be displaceable between a folded configuration and an unfolded configuration.

The second wheel arrangement may be displaceable to an intermediate configuration between the folded and unfolded configurations, when the patient transport apparatus is configured in the third configuration.

The arrangement of the first and second wheel assemblies may be such that the second wheel arrangement may be inhibited from being displaced beyond the intermediate configuration, when the first wheel arrangement is located in the unfolded configuration. The second wheel sub-frame may butt against the first wheel sub-frame when the second wheel arrangement is configured in the intermediate configuration and the first wheel arrangement is configured in the unfolded configuration.

The configuration of the first and second wheel assemblies may be such that when the second wheel sub-frame butts against the first wheel sub-frame, the second wheel sub-frame may be held at a predetermined angle, facilitating the main portion of the patient support assembly to be supported in a substantially horizontal configuration when the patient support apparatus is located on stairs.

The patient transport apparatus may comprise a stabiliser wheel arrangement extending in the direction of the second portion of the patient support assembly. The stabiliser wheel arrangement may comprise a stabiliser wheel frame and a caster.

A connecting member may be provided between the second wheel sub-frame and the stabiliser wheel arrangement for releasably locking the second wheel arrangement and the stabiliser wheel arrangement together.

The connecting member may be pivotably fixed to the second wheel sub-frame.

The patient transport apparatus may comprise at least a first patient securing device, for securing the patient relative to the patient support assembly. The patient securing device may comprise a first belt, in use, extending over a mid-section of a body of the patient, thereby securing the patient to the main portion of the patient support assembly. A position of the first belt may be adjustable relative to the patient support assembly.

The patient transport apparatus may furthermore comprise a second and third patient securing device, for securing the patient relative to the patient support assembly.

The second patient securing device may comprise a second belt, in use, extending over a lower portion of the body of the patient, thereby securing the patient to the first portion of the patient support assembly.

The third patient securing device may comprise a third belt, in use, extending over a torso of the patient, thereby securing the patient to the second portion of the patient support assembly. The patient support assembly may include a first and a second set of lugs or alternatively a sliding cavity or slot on each side. The third patient securing device may be received through a specific one of the sets of lugs or be displaceable within the sliding cavity or slot, to accommodate different positions of the third patient securing device relative to the patient support assembly. The patient transport apparatus may comprise a footrest against which feet of a patient may rest in use. The footrest may prevent the patient from sliding from the patient support assembly.

The footrest may include a handle with which the patient transport apparatus may be manoeuvred in use.

The patient transport apparatus may furthermore comprise a first and second arm rest. The first and second arm rests may be adjustable and may be releasably locked in position in an upright orientation.

The patient transport apparatus may comprise a push handle.

The patient transport apparatus may provide for the storage of equipment, such as oxygen tanks and may include an oxygen tank storage mechanism. The patient transport apparatus may furthermore comprise an intravenous hook.

The main portion and first and second portions of the patient support assembly may be covered by high density foam.

Alternatively, the main portion and first and second portion of the patient support assembly may comprise moulded plastic portions.

Frame portions of the patient transport apparatus may be manufactured from tubular members, such as aluminium, stainless-steel tube members or a combination thereof. Tube members may be interconnected by means of elbow members, T-members, pivotable tubular members or connecting pivotable members.

BRIEF DESCRIPTION OF THE DRAWINGS

The invention will now be described in more detail, by way of example only, with reference to the accompanying drawings in which.

DESCRIPTION OF THE ILLUSTRATED EMBODIMENTS

Figure 1:
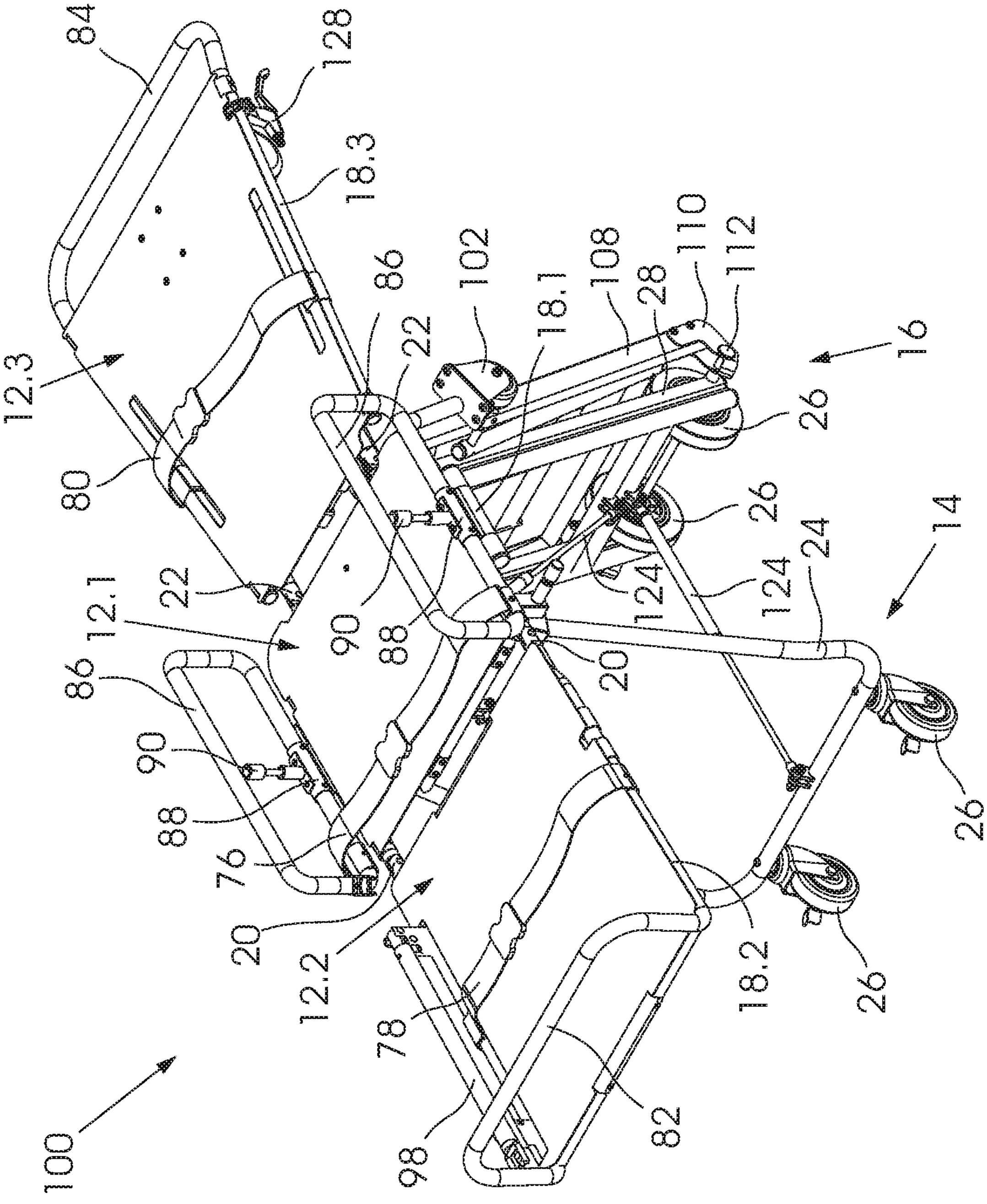
FIG. 1 shows a front top perspective view of a patient transport apparatus in accordance with a first example embodiment of the invention, in a first configuration in which the patient transport apparatus is configured as a stretcher, and in which some detail is omitted to reveal normally concealed detail.
Figure 2:
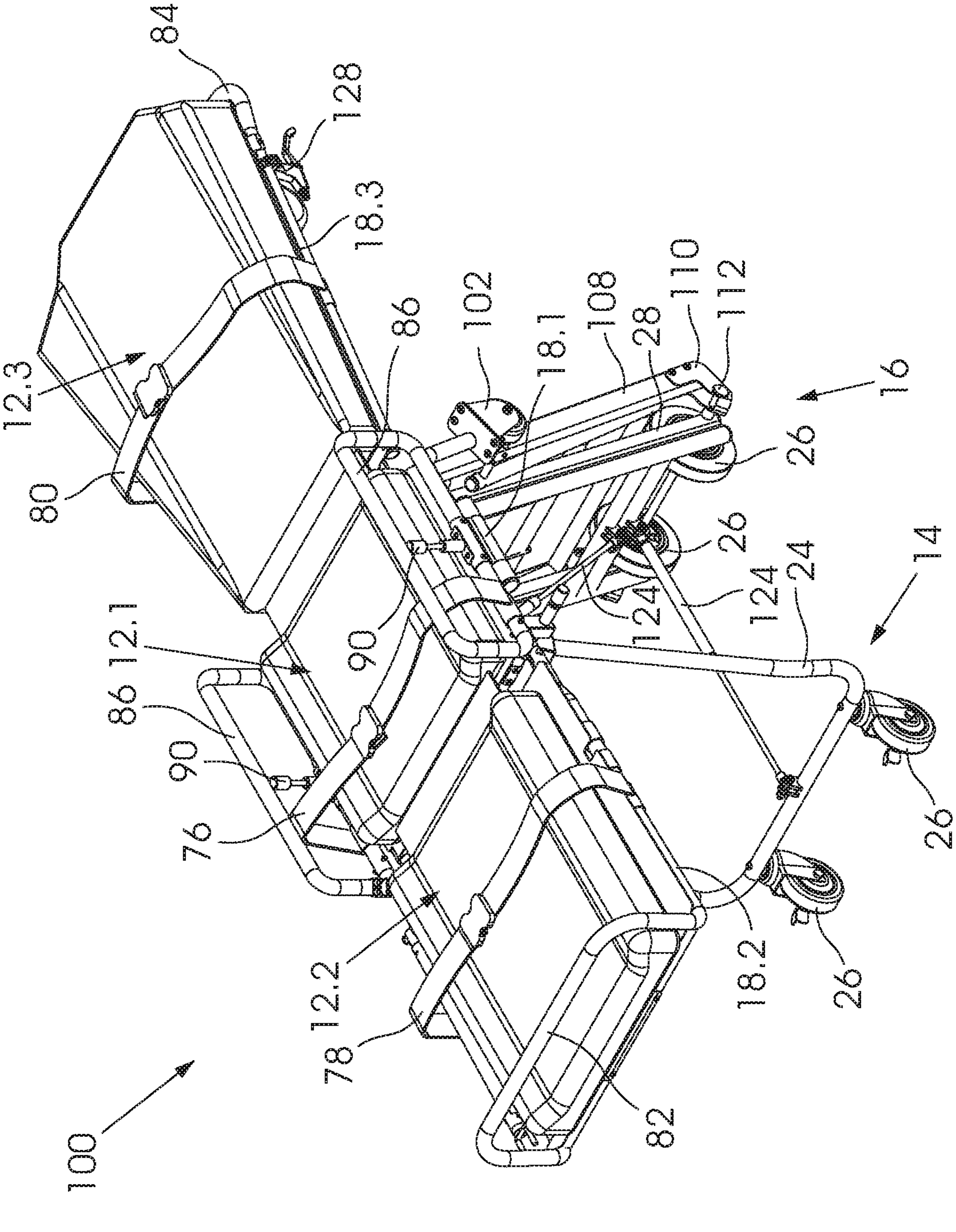
FIG. 2 shows a further front top perspective view of the patient transport apparatus of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "engaged" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "engaged" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring to the figures, in which like numerals indicate like features, a first non-limiting example of a patient transport apparatus (or just "apparatus") in accordance with the invention is generally indicated by reference numeral 100 (in FIGS. 1 to 15). A second non-limiting example of a patient transport apparatus in accordance with the invention is generally indicated by reference numeral 10 (in FIGS. 16 to 38). It will be appreciated that the first and second example embodiments of the apparatus (100, 10) share certain common (though not necessarily physically identical) features, which are in some instances designated by like numerals. The common features, when designated by like reference numerals, will be discussed with reference to one of the example embodiments only, and it will be appreciated that each feature performs a similar function in respect of the other example embodiment, even though not described or discussed, unless otherwise mentioned.

As will become apparent from the description that follows, both the apparatuses (100, 10) are adapted to act as emergency medical services (EMS) patient transport apparatuses, and various components and aspects of the apparatuses (100, 10) are specifically designed and adapted for this purpose.

With reference to FIGS. 1 to 15, the apparatus 100 comprises a patient support assembly (generally designated by reference numeral 12) which comprises of a main portion 12.1, a first portion 12.2 and a second portion 12.3. The main portion 12.1 is located centrally, and between the first and second portions (12.2 and 12.3). The first and second portions (12.2 and 12.3) therefore extend on opposite sides of the main portion 12.1. The first and second portions (12.2 and 12.3) of the patient support assembly 12 are independently and pivotably adjustable relative to the main portion 12.1. This independent adjustability of the first and second portions (12.2 and 12.3) facilitates the configuration of the apparatus 100 in various predetermined configurations, as will be described in more detail below.

The apparatus 100 further comprises a first wheel arrangement 14 and a second wheel arrangement 16. The first and second wheel arrangements (14 and 16) are adjustable relative to each other, and also adjustable relative to the patient support assembly 12. In the case of apparatus 100, the first and second wheel arrangements may also, by means of being interconnected by gas struts (as is described more fully below) be adjustable as a unit. In the case of the second example embodiment apparatus 10, independent adjustability of the wheel arrangements plays a vital role in the configuration of the apparatus 10 in the various configurations (as discussed more fully below).

The adjustability of the first and second portions (12.2 and 12.3) of the patient support assembly 12 and the adjustability of the first and second wheel arrangements (14, 16) facilitate configuring the apparatus 100 in three or more configurations.

When the apparatus 100 is configured in the first configuration, the apparatus 100 is configured as a stretcher (typically shown in FIGS. 1, 2, 4, 8 and 12 to 15). When the apparatus 100 is configured in the second configuration, the apparatus 100 is configured as a chair or more particularly, a wheelchair (typically shown in FIG. 9). When the apparatus 100 is configured in the third configuration, the apparatus 100 is configured as a "stair chair" (typically shown in FIGS. 3, 10 and 11). These configurations, and the hardware provided to facilitate these configurations, and interchangeability between these configurations, are discussed in more detail below.

The main portion 12.1, the first portion 12.2 and the second portion 12.3 are associated with a main support frame 18.1, a first support frame 18.2 and a second support frame 18.3, respectively.

The first support frame 18.2 is pivotably attached to the main support frame 18.1, by means of a first pivot member 20, while the second support frame 18.3 is pivotably attached to the main support frame 18.1 by means of a second pivot member 22.

The first wheel arrangement 14 comprises a first wheel subframe 24 and a pair of wheels or casters (generally indicated by reference numeral 26), while the second wheel arrangement 16 comprises a second wheel subframe 28, also fitted with a pair of wheels or casters 26.

The first and second wheel arrangements (14, 16) are pivotably fixed relative to the support assembly 12. More particularly, the first and second wheel subframes (24, 28) are pivotably fixed relative to the support assembly 12. The first wheel subframe 24 is attached or fixed to the main support frame 18.1 by means of a first subframe pivot member 30 and the second wheel subframe 28 is attached or fixed to the main support frame 18.1 by means of second subframe pivot members 32.

Figure 4:
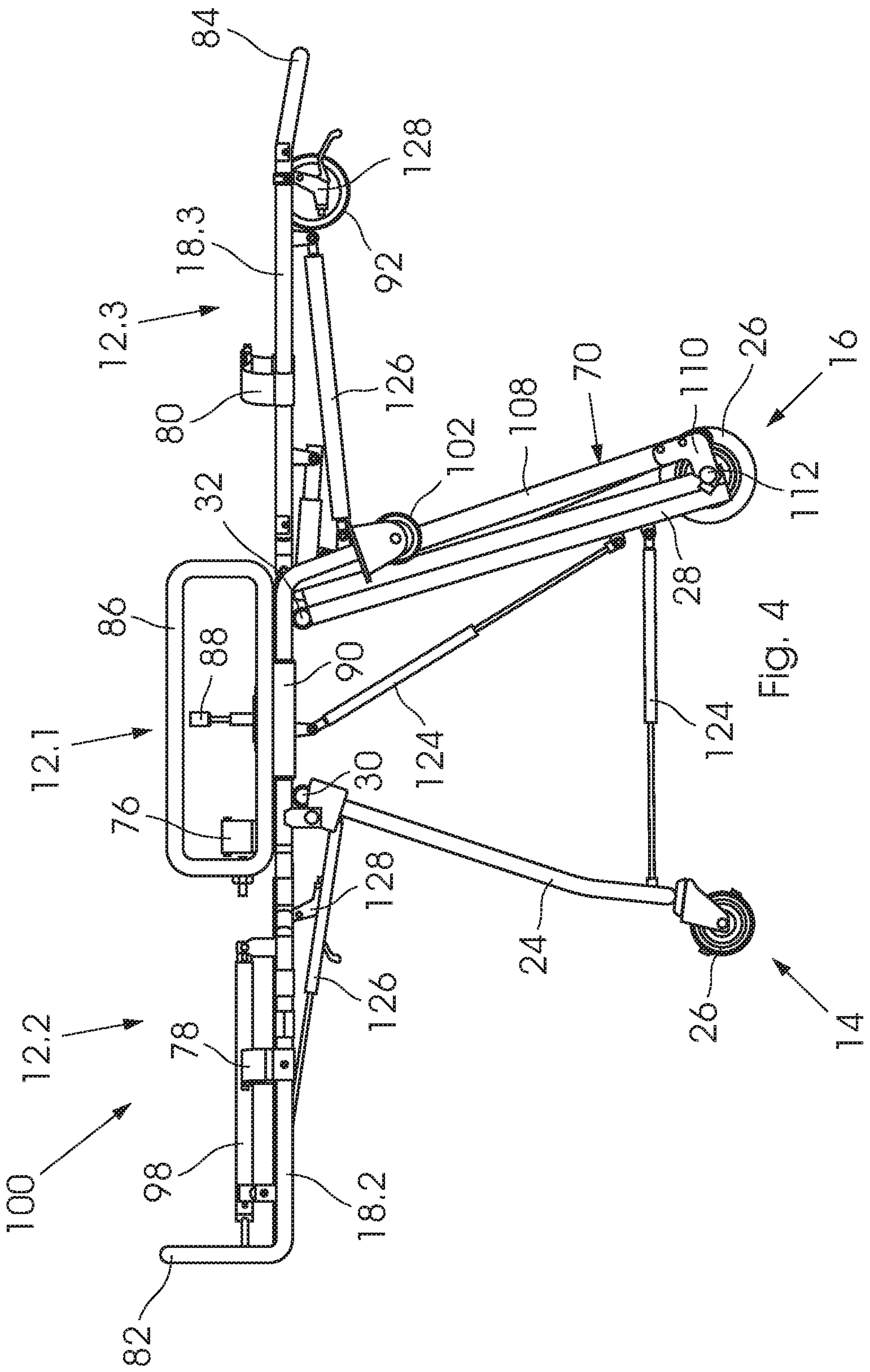
FIG. 4 shows a side view of the patient transport apparatus of FIG. 1, in the first configuration.
Figure 5:
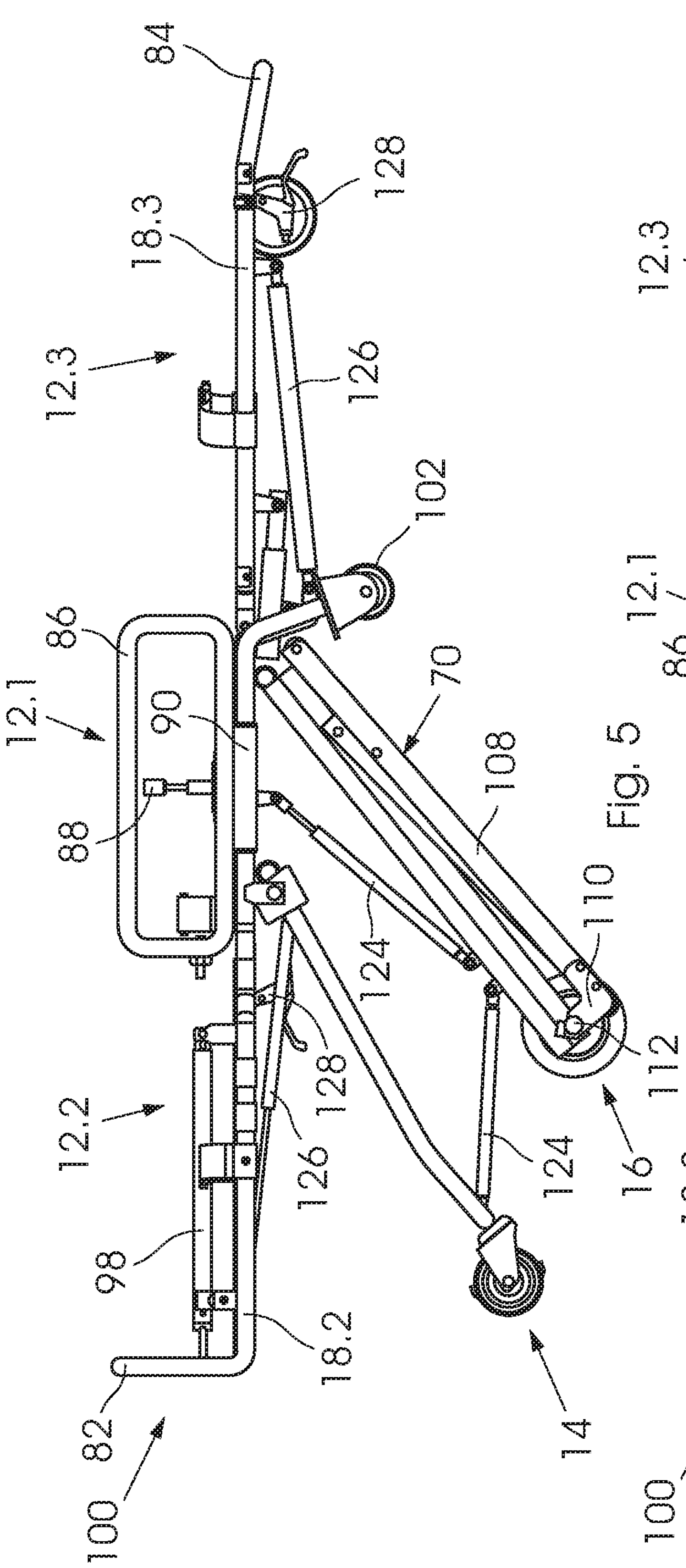
FIG. 5 shows a side view of the patient transport apparatus of FIG. 1, in which a first and second wheel arrangements are in the process of being configured in a folded configuration, to allow transportation of the apparatus in an ambulance.
Figure 6:
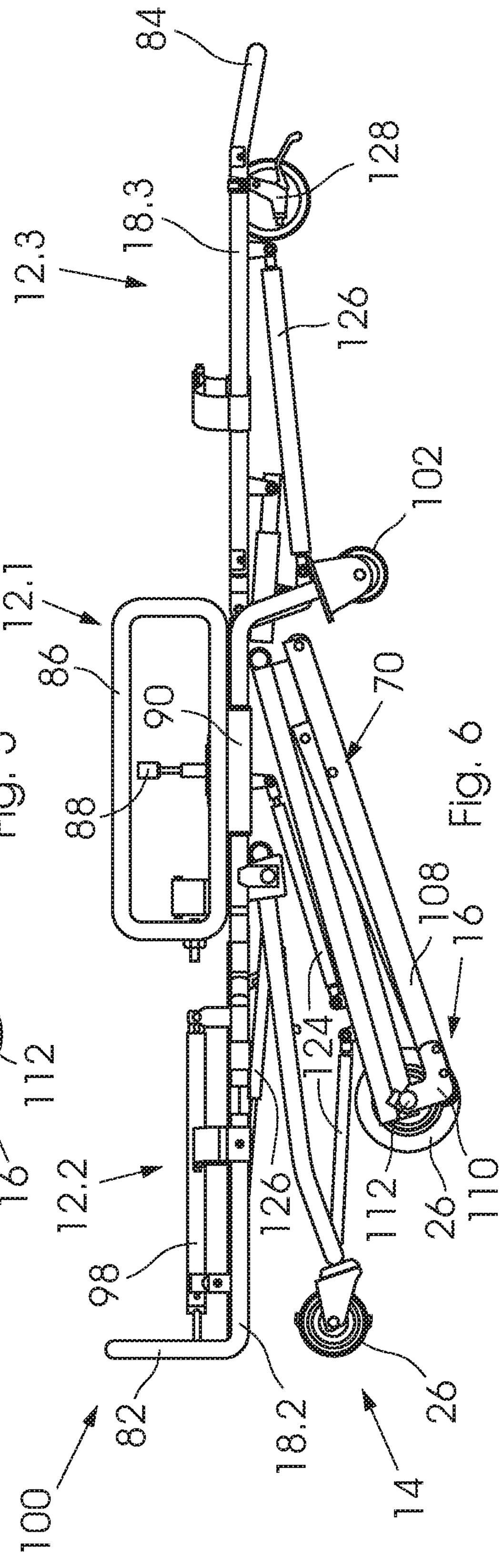
FIG. 6 shows a side view of the patient transport apparatus of FIG. 1, in which the first and second wheel arrangements are configured in the folded configuration.

The first wheel arrangement 14 is displaceable between a folded configuration (shown in FIG. 6) in which the first wheel arrangement 14 is folded forwards (or flat), and an unfolded configuration (typically shown in FIG. 4, for example).

Similarly, the second wheel arrangement 16 is displaceable between a folded configuration (shown in FIG. 6) in which the second wheel arrangement 16 is folded forwards (or flat), and an unfolded configuration (typically shown in FIG. 4, for example).

When the first and second wheel arrangement (14, 16) are in the folded configuration, the first and second wheel arrangement (14, 16) lie substantially flat relative to the patient support assembly 12, enabling the apparatus 100 to be received within an ambulance. The apparatus 100 is provided with support wheels 102 which support the patient support assembly 12 when the apparatus is received in the ambulance. The support wheels 102 are mounted to, or extend from, the main support frame 18.1. This allows the second patient support assembly 12.3 to be pivoted upwards when the apparatus 100 is located in the ambulance, such as when a patient needs to be supported in the Fowler position (as discussed more fully below).

When the apparatus 100 is configured in the first configuration (which is typically shown in FIGS. 1, 2, 4, 8 and 12 to 15) the apparatus is configured as a stretcher, and the first and second portions (12.2 and 12.3) of the patient support assembly 12 are substantially aligned with each other and with the main portion 12.1. The first and second wheel arrangements (14 and 16) now support the patient support assembly substantially horizontally.

When the apparatus 100 is configured in the second configuration (which is typically shown in FIG. 9) the apparatus is configured as a wheelchair, allowing the patient to be supported in a seated position. Now, the first and second portions (12.2 and 12.3) of the patient support assembly 12 are pivoted relative to each other and relative to the main portion 12.1. The first and second wheel arrangements (14 and 16) support the main portion 12.1 of the patient support assembly 12 substantially horizontally. The first portion 12.2 of the patient support assembly 12 is pivoted downwards (typically by about 80 degrees) and supports lower limbs of the patient, while the second portion 12.3 of the patient support is pivoted upwards (by between 0 and 90 degrees, but typically by between 65 and 85 degrees) and supports an upper body or torso of the patient. In some cases, the first portion 12.2 may be retained in a substantially horizontal orientation or may even be pivoted slightly upwards (typically by up to 15 degrees) should this be required, resulting in apparatus 100 being configured in the fourth configuration (typically shown in FIGS. 4 and 7).

When the apparatus 100 is configured in the third configuration the apparatus is configured as a "stair chair", allowing the patient to be supported in a seated position, whilst transporting the patient down a stairway. The patient support assembly 12 is configured similar as discussed above in respect of the second configuration (wherein the apparatus 100 is configured as a wheelchair). However, for ergonomic purposes, the second support portion 12.3 is now typically pivoted upwards by about 65 degrees.

Figure 11:
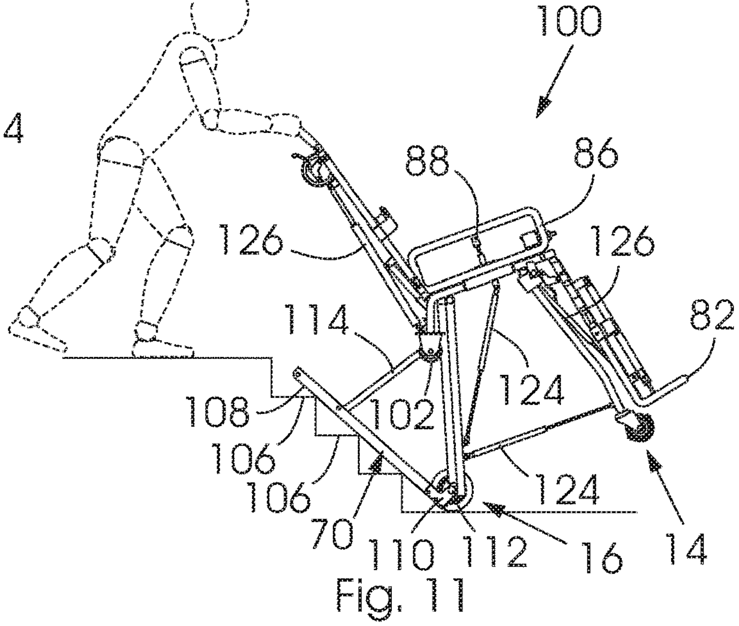
FIG. 11 shows a side view of the patient transport apparatus of FIG. 1, in the third configuration, in use, while traversing a set of stairs.
Figure 12:
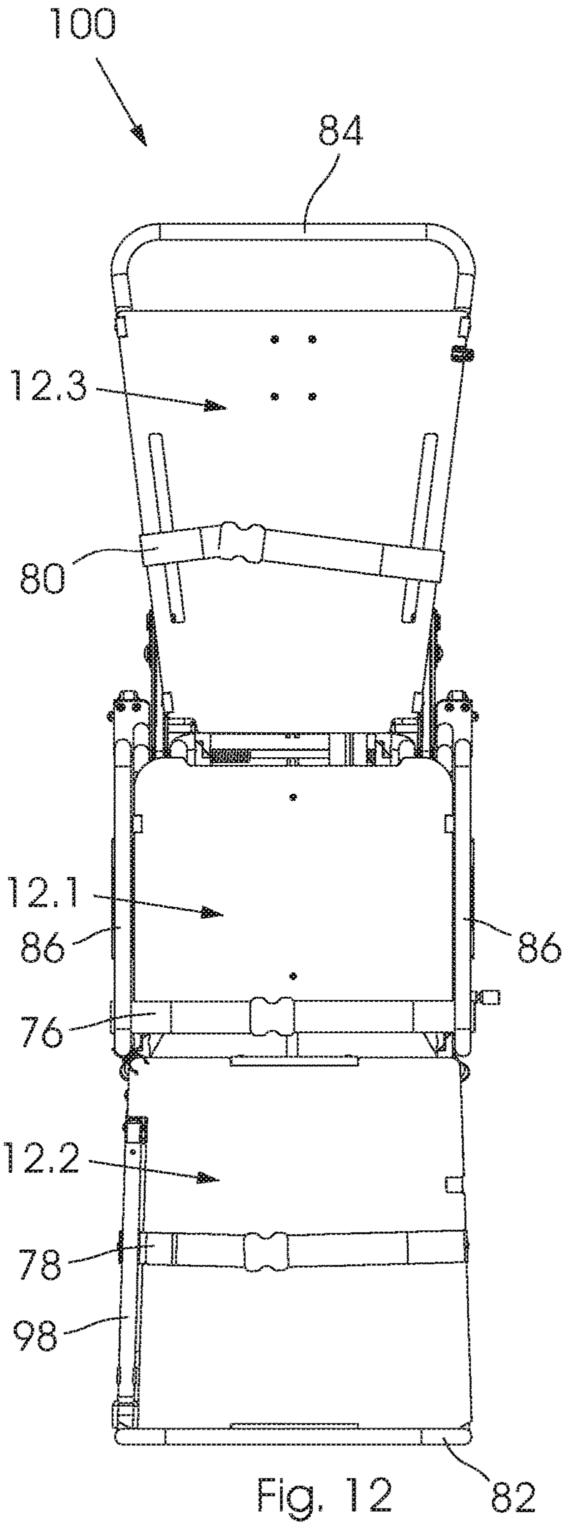
FIG. 12 shows a top view of the patient transport apparatus of FIG. 1, in the first configuration.
Figure 13:
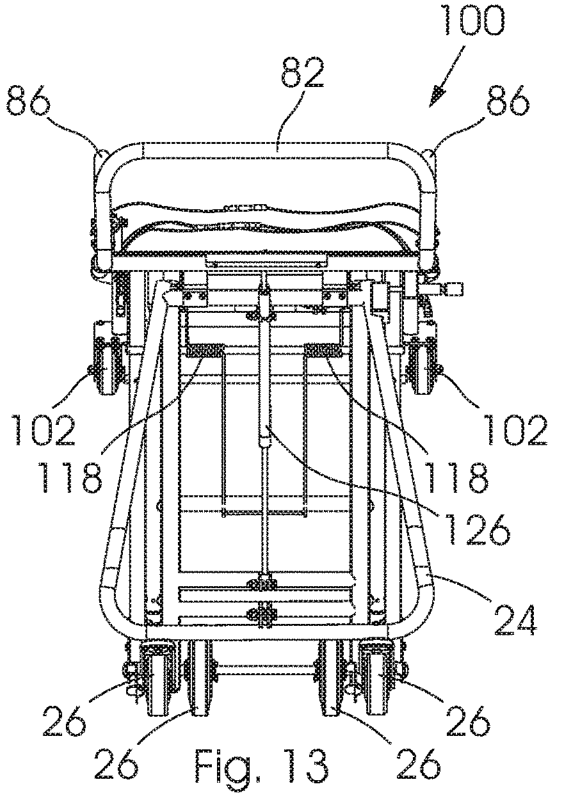
FIG. 13 shows front view of the patient transport apparatus of FIG. 1, in the first configuration.
Figure 14:
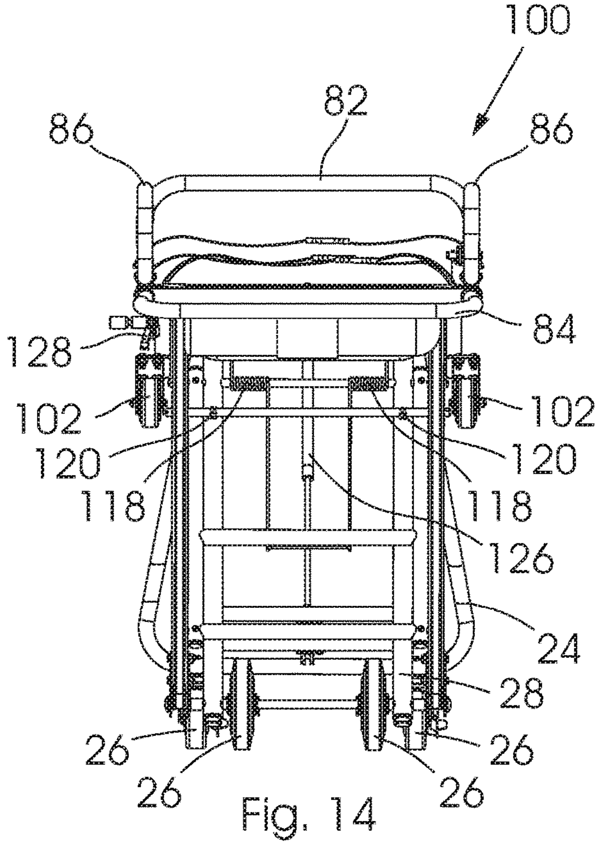
FIG. 14 shows rear view of the patient transport apparatus of FIG. 1, in the first configuration.
Figure 15:
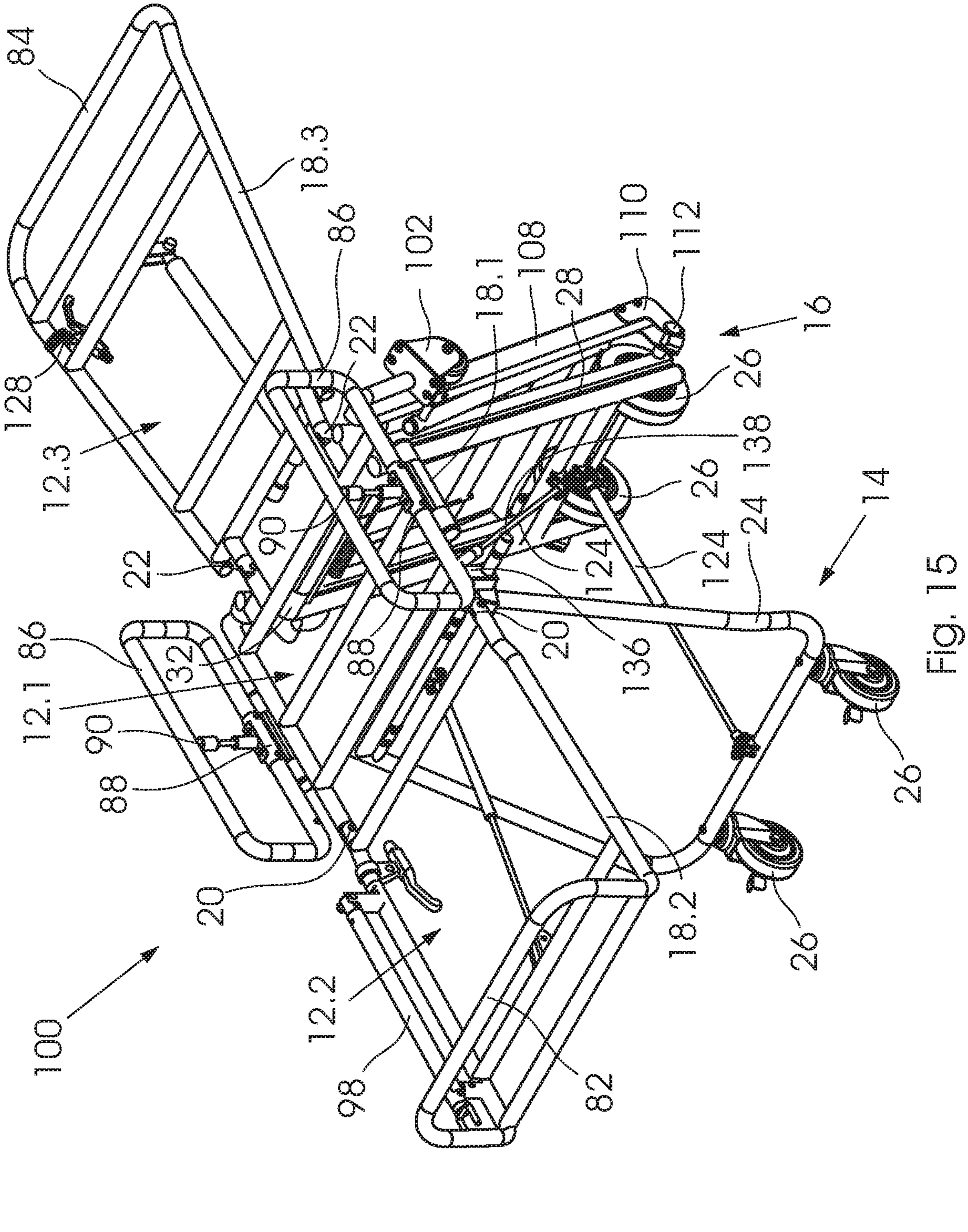
FIG. 15 shows a perspective view of the patient transport apparatus of FIG. 1, in which further detail has been omitted to reveal detail of structural components thereof.
Figure 16:
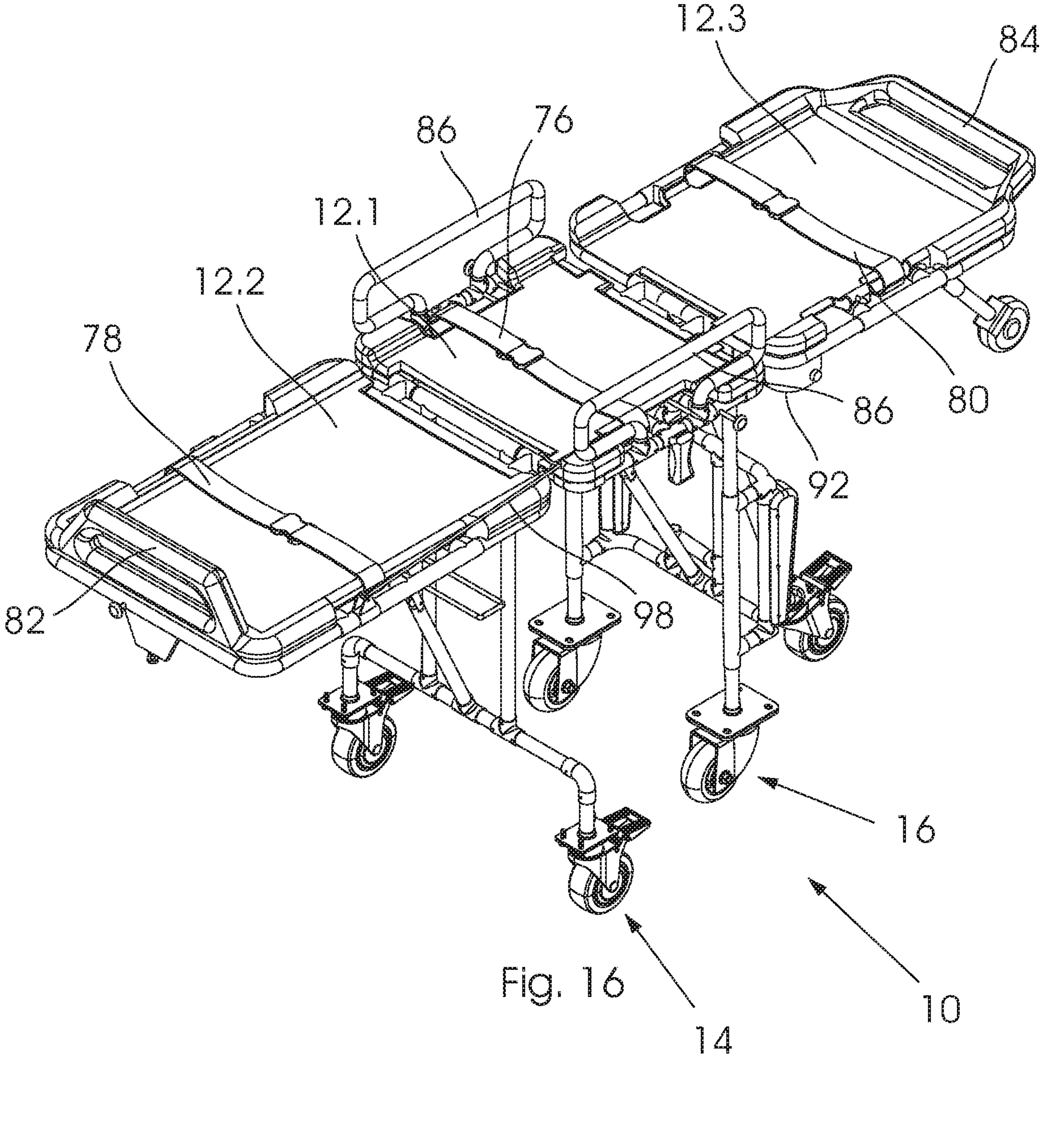
FIG. 16 shows a front top perspective view of a second example embodiment of the patient transport apparatus in accordance with the invention, in a first configuration in which the patient transport apparatus is configured as a stretcher.
Figure 17:
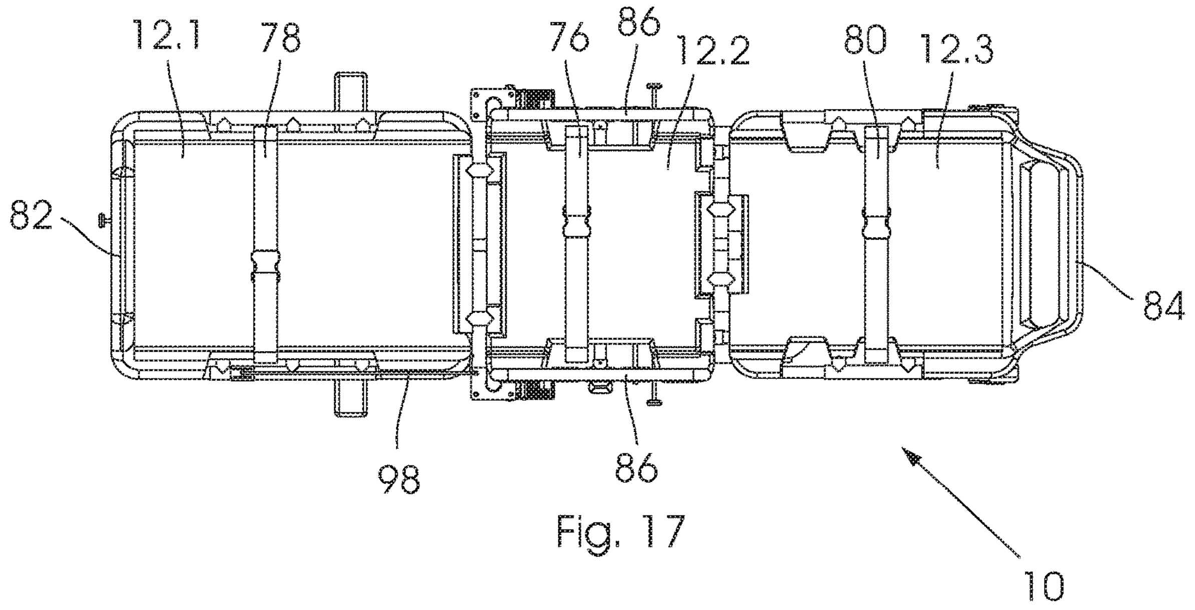
FIG. 17 shows a top view of the patient transport apparatus of FIG. 16 in the first configuration.

The apparatus 100 comprises at least a first, but typically also a second stair engagement device 70. In use, when the apparatus 100 is configured in the third configuration, the first and second stair engagement devices 70 are configured in a position to engage edges of a stair 106. The stair engagement device comprises a first and second contact surface which, in use, are provided for engaging the edge of the stair 106 (typically as shown in FIG. 11). The first and second contact surfaces are each formed by an endless belt or a track, each supported by a first and second pulley. The length of the contact surface of the stair engagement device 70 is such that at least two consecutive stairs 106 are spanned in use, thereby allowing the apparatus 100 to be supported in relatively smooth fashion, when traversing a set of stairs 106.

Figure 3:
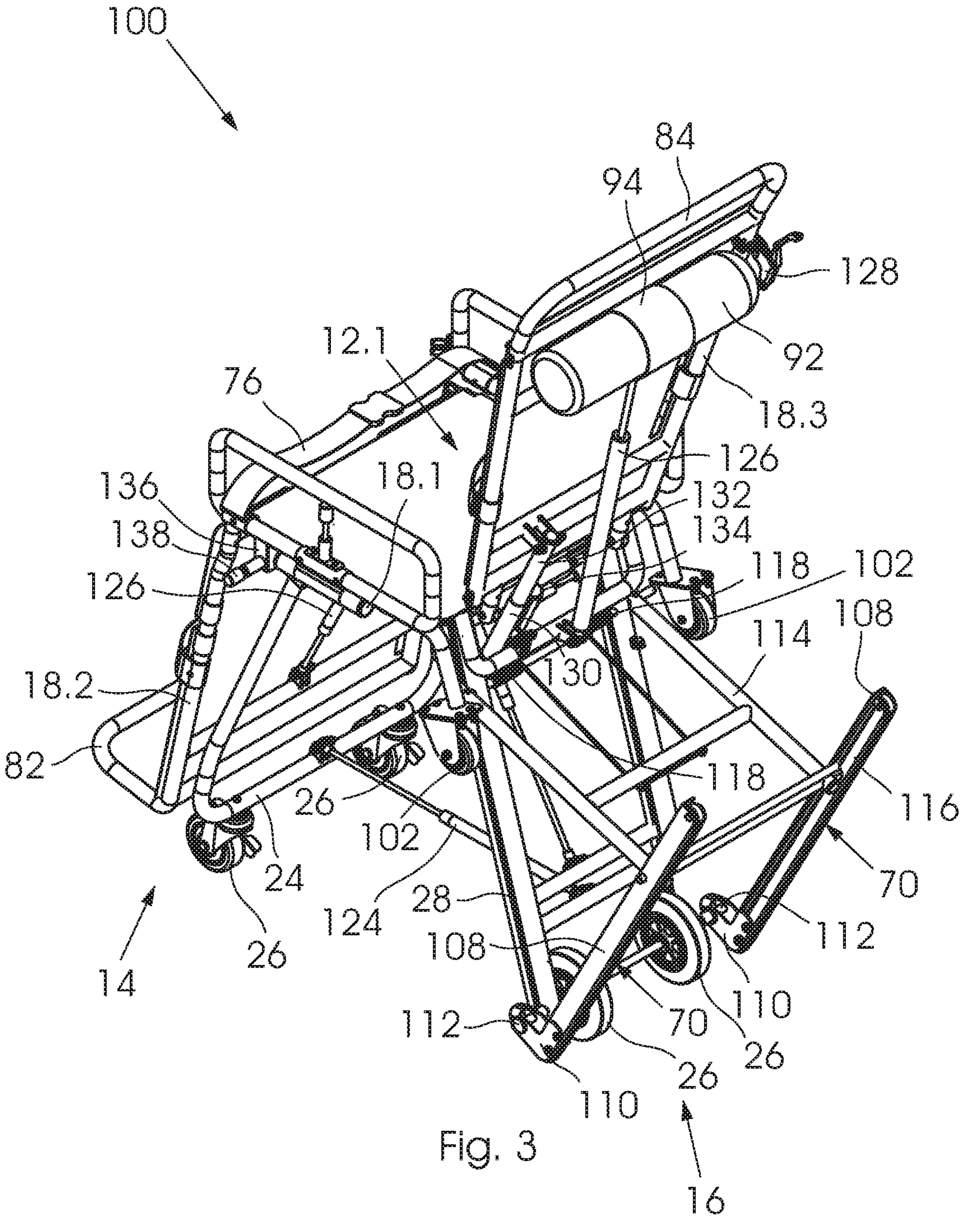
FIG. 3 shows a rear perspective view of the patient transport apparatus of FIG. 1, in a third configuration in which the patient transport apparatus is configured as a stair chair.
Figure 10:
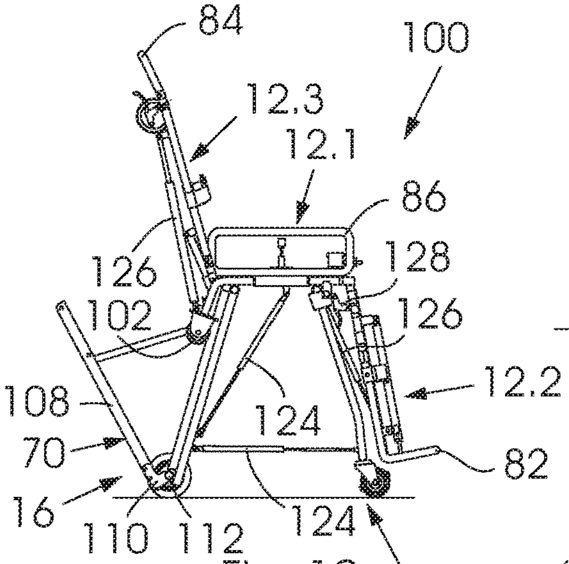
FIG. 10 shows a side view of the patient transport apparatus of FIG. 1, in the third configuration.

In use, and as shown in FIGS. 3 and 10, the stair engagement device 70 is arranged at a predetermined angle (typically about 35 degrees relative to the first support portion 12.1 or relative to a vertical plane) to ensure that the main patient support portion 12.1 is supported in a substantially horizontal (or slightly slanted backwards) orientation when the apparatus 100 (configured as a stair chair) is located on the set of stairs 106 (as shown in FIG. 11).

Some distinct differences exist between the first and second example embodiments of the apparatus (100, 10) when it comes to the third configuration.

The apparatus 100 includes a stair engagement subframe 108, to which the first and second stair engagement devices 70 are fixed. The stair engagement subframe 108 is pivotably fixed to a bottom portion of the second wheel subframe 28, by means of first and second stair engagement subframe pivots 110. The stair engagement subframe 108 is pivotably displaceable between a folded configuration (typically shown in FIG. 4) and an operative configuration (typically shown in FIGS. 3, 10 and 11). It will be understood that the stair engagement subframe 108 is configured in the operative configuration whenever the apparatus 100 is configured in the third configuration.

The stair engagement subframe pivots 110 are substantially L-shaped, such that the point 112 about which the stair engagement subframe 108 pivots, is spaced perpendicularly from the contact surfaces. This spaces the contact surfaces away from the second wheel subframe 28 (when the stair engagement subframe 108 is configured in the operative configuration), to prevent interference between the wheels 26 of the second wheel arrangement 16 and the stairs 106.

A brace 114 is pivotably fixed to a top portion of the second wheel subframe 28 and extends to the stair engagement subframe 108. The brace 114 is provided for supporting the stair engagement subframe 108 when in the operative configuration. Ends of the brace 114 are slidably received in an axially extending track or slot 116 of the stair engagement subframe 108.

A first and second torsion spring 118 extends between the brace 114 and the second wheel subframe 28, such that the brace biases the stair engagement subframe 108 towards the operative configuration.

A retaining clip 120 is provided for releasably retaining the stair engagement subframe 108 in the folded configuration (against the bias) when the apparatus 100 is not configured in the third configuration.

It will be appreciated that the brace 114 is provided for transferring forces between the stair engagement devices and the second wheel subframe 28, thereby supporting the weight of the apparatus 100 (and that of the patient) when the apparatus is located on a set of stairs 106 and inhibits the stair engagement subframe 108 from collapsing.

The apparatus 100 comprises a number of gas struts. Firstly, gas struts 124 are provided between the first and second wheel arrangements (14, 16) and between the second wheel arrangement 16 and the main portion 12.1, to aid in unfolding the wheel arrangements and lifting the apparatus up into an operable configuration.

Secondly, a lockable gas strut 126 is arranged between the first wheel arrangement 14 and the first portion 12.2, for supporting and locking the first portion 12.2 in various positions relative to the main portion 12.1. Similarly, a lockable gas strut 126 is arranged between the second wheel arrangement 16 and the second portion 12.3, for supporting and locking the second portion 12.3 in various positions relative to the main portion 12.1. Each lockable strut 126 is associated with a release handle 128 which, when actuated, allows adjustment of the lockable strut 126. The release handles 128 may be located on either side of the apparatus, depending on a layout of the ambulance and the position of a paramedic or operator relative to the apparatus within the back of an ambulance.

A lock mechanism (which is best shown in FIG. 3) is provided for locking the second portion 12.3 in one or more specific predetermined positions relative to the main portion 12.1. The lock mechanism comprises a pivotably mounted sleeve 130 fixed relative to the second wheel subframe 28, and a pivotably mounted member 132 slidably received therein, which member is connected to the second support frame 18.3. In use, a spring-loaded pin 134 extends through a hole in the sleeve 130 and into a hole in the member 132. The pin 134 may have a handle or may be an L-shaped lever to facilitate easy handling thereof. The lock mechanism may be positioned on either side of the apparatus, depending on the layout of the ambulance and the position of the paramedic or operator within the ambulance.

A similar lock mechanism may be provided for locking the first wheel arrangement 14 and thereby also the second wheel arrangement 16 in the unfolded configurations. The lock however comprises of two machined blocks. A first machined block 136 secured onto the main support frame 18.1, while a second block (not shown) is secured onto the first wheel sub frame 24. In use, a spring-loaded pin 138 extends through a hole in the first block (located on the main support frame 18.1) into a locating hole in the second block (located on the first wheel sub frame 24). When not in use, the spring-loaded pin is released from the second block while remaining in the first block, therefore resulting in the spring-loaded pin remaining in a compressed position on the second block's surface, while the first and second wheel arrangements are in the folded configuration. When the first and second wheel arrangements are unfolded, the pin moves on the surface of the second block until locating in the locating hole of the second block. The pin may once again comprise a handle or may be an L-shaped lever to facilitate easy handling thereof.

In addition to the lock mechanisms above, it will be appreciated that the lockable gas struts may also serve as locking arrangements for the various displaceable parts, and that the lockable gas struts may allow locking at various positions.

Typically, an ambulance may be adapted for facilitating use of the apparatus 100. In this regard, an ambulance lock may be mounted to a floor portion of the ambulance, with which the apparatus 100 may be secured relative to the ambulance. More specifically, the ambulance lock may be arranged to clamp onto a side portion of the main support frame 18.1 or alternatively the first support frame 18.2 (so as not to interfere with any of the other subframes, mechanisms or hardware associated with the wheel arrangements of the apparatus 100).

Since the apparatus 100 is configured as an EMS apparatus, various patient securing devices are provided with which the patient is, in use, secured relative to the apparatus 100.

This includes a first adjustable belt 76 which, in use, extends over a mid-section of the patient, securing the patient relative to the main support frame 18.1. The position of the first adjustable belt 76 relative to the main portion 12.1 is adjustable to accommodate different anatomies of the patients.

The apparatus also includes a second and third adjustable belt (78, 80). A set of sliding cavities or slots are provided to receive the third adjustable belt 80 relative to the patient support assembly 12, to accommodate varying lengths of patients. It will be understood that the most suitable position within the sliding cavity or slot through which the third belt 80 is received in use will be selected so that the belt will run over a torso of the patient, and may differ, depending on whether the patient is a child or an adult.

Towards a foot-end of the apparatus 100, a footrest 82 with an integrated handle is provided. The footrest 82 is provided for preventing the patient from sliding from the patient support assembly 12, whilst enabling medical personnel to manoeuvre the apparatus 100. A push handle 84 is provided at a head end of the apparatus 100, also for manoeuvring the apparatus 100, and when transporting a patient down a flight of stairs.

The apparatus 100 is provided with a first and second arm rest 86, pivotably fixed to either side of the main support frame 18.1 via arm rest hinge members 88. Arm rest locking members 90 are provided for locking the arm rests 86 in an upright position.

When the arm rest lock members 90 are unlocked, the arm rests 86 may be pivoted downward to facilitate easy transfer of the patient from the apparatus 100 to another bed, such as a hospital bed or a spinal board. When the arm rests 86 are pivoted to the upward position and locked in place, the arm rests 86 may be used to secure a spinal board supporting the patient (when the apparatus is configured in the "stretcher" configuration. The arm rests 86 are manufactured from tubular members, and may be used to hook equipment, such as heart monitors onto.

The apparatus 100 facilitates the storage of medical equipment. In this regard, an oxygen tank 92 may be fixed to the apparatus by means of an oxygen tank storage bracket 94. Furthermore, a bracket 98 is provided for housing intravenous (IV) treatment equipment (not shown).

The patient support assembly 12 is typically manufactured from moulded plastic components. Alternatively, the patient support assembly 12 may be covered with high density foam or a mattress to provide cushioning for a patient received thereon. A metal plate, such as an aluminium plate, may provide support and rigidity to the foam or mattress.

Frame portions of the apparatus 100 are manufactured from tubular members, such as aluminium or stainless-steel tube members or a combination thereof. These tube members are interconnected by means of elbow members, T-members, pivotable tubular members as well as connecting pivotable members, and fastened by tubular rivets, hollow rivets, pop rivets and various bolts, or are bent into shapes as shown.

Figure 7:
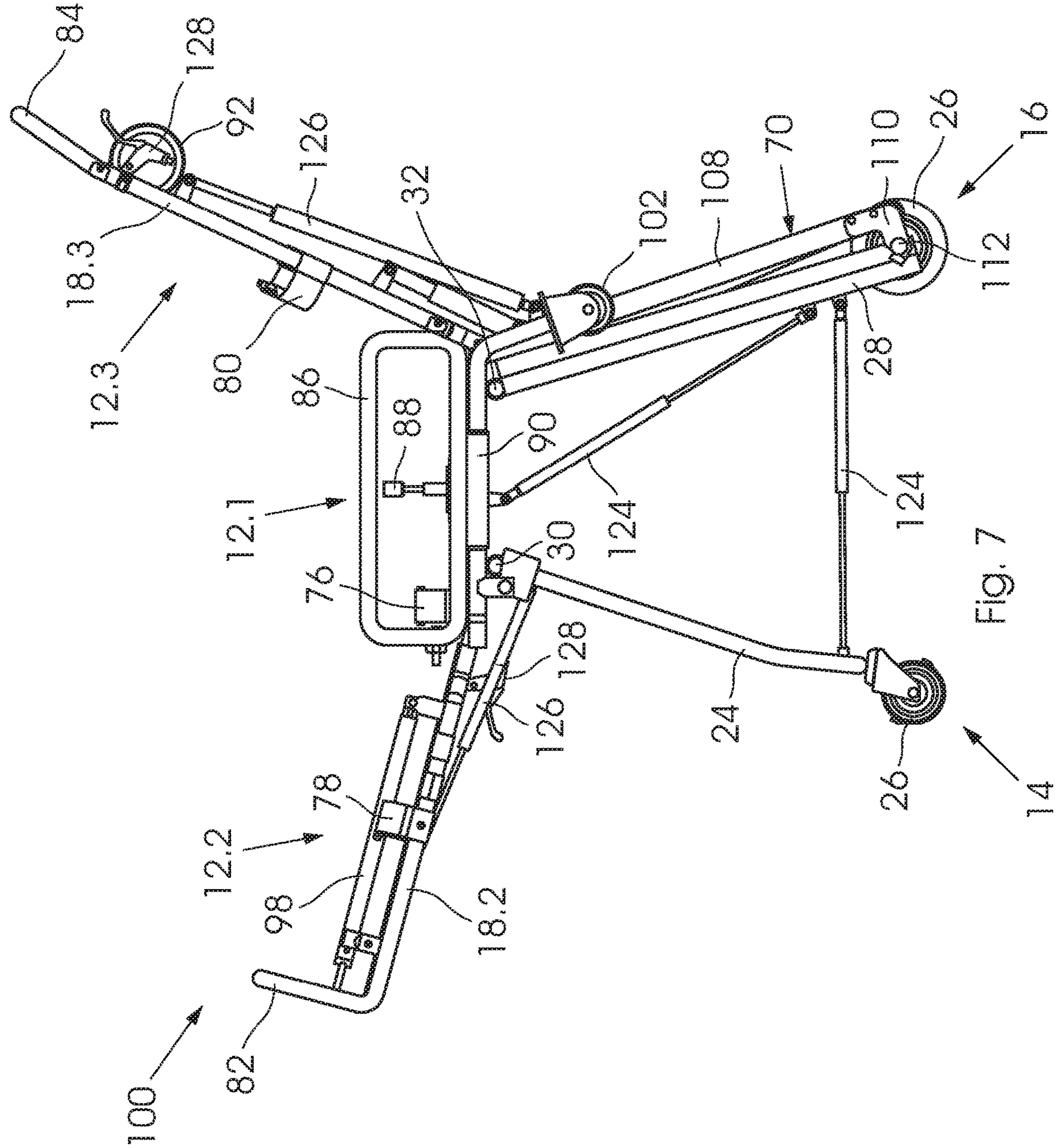
FIG. 7 shows a side view of the patient transport apparatus of FIG. 1, in the fourth configuration, in which a patient is, in use, supported in a Fowler's position.
Figure 8:
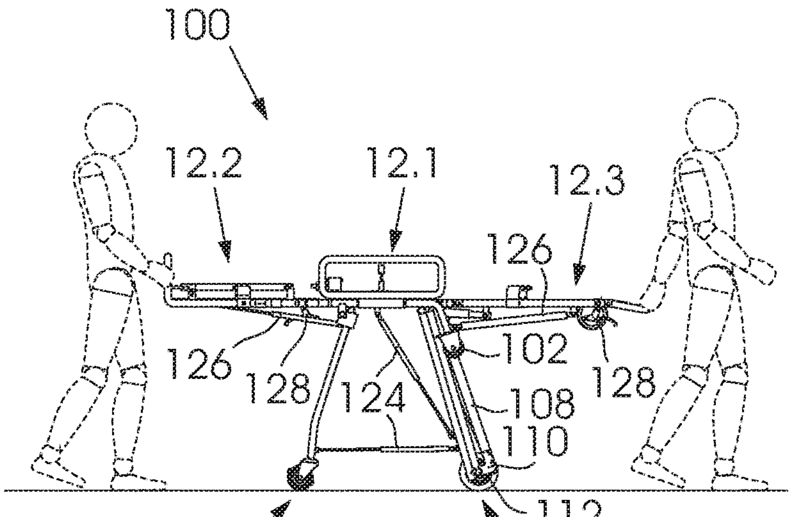
FIG. 8 shows a side view of the patient transport apparatus of FIG. 1, in use, in the first configuration.
Figure 9:
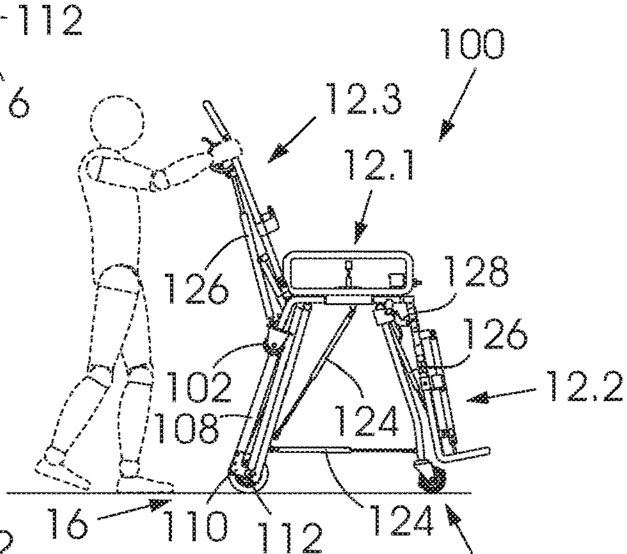
FIG. 9 shows a side view of the patient transport apparatus of FIG. 1, in use and in a second configuration in which the patient transport apparatus is configured as a wheelchair.

The patient transport apparatus 100 is also configurable in a fourth configuration, in which the second portion of the patient support assembly is pivoted relative to the main portion 12.1 of the patient support assembly, while the first portion of the patient support assembly is provided substantially aligned with the main portion of the patient support assembly, or pivoted slightly upwards (typically, up to 15 degrees upwards). When the patient transport apparatus is supported in the fourth configuration, the patient may be supported in a Fowler's position (as shown in FIGS. 4 and 7).

Reference is now made to the second example embodiment of the apparatus 10, and particularly, FIGS. 16 to 38.

Now, the second wheel arrangement 16 is configurable in an intermediate configuration, which is between the folded and unfolded configurations. As discussed more fully below, the second wheel arrangement 16 is configured in the intermediate configuration when the apparatus 10 is configured as a stair chair.

The second wheel arrangement 16 is retained in the intermediate configuration, by the first wheel arrangement 14. It will therefore be understood that the first wheel arrangement 14 needs to remain in the unfolded configuration, for the second wheel arrangement 16 to be configured in the intermediate configuration.

The second wheel arrangement 16 is configured into the intermediate configuration by pivoting the second wheel arrangement 16 forwards from the unfolded configuration, towards the folded configuration, until further pivoting thereof is inhibited by interference of the second wheel subframe 28 with the first wheel subframe 24.

The geometries of the first and second wheel subframes (24, 28) are such that the second wheel subframe 28 is arranged at a predetermined angle (again, about 35 degrees) relative to the main portion 12.1 of the support assembly 12 when the second wheel arrangement is in the intermediate configuration. This predetermined angle is calculated to allow the main portion 12.1 of the support assembly 12 to be supported substantially horizontally or slight backwards when a patient is transported up or down a flight of stairs, using the apparatus 10.

Figure 18:
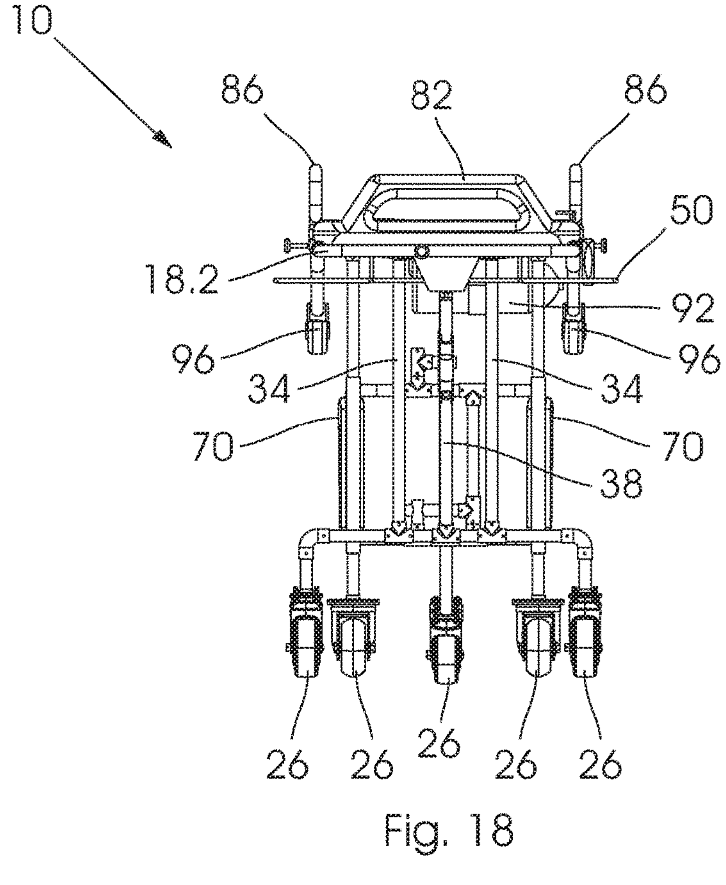
FIG. 18 shows a front view of patient transport apparatus of FIG. 16 in the first configuration.
Figure 19:
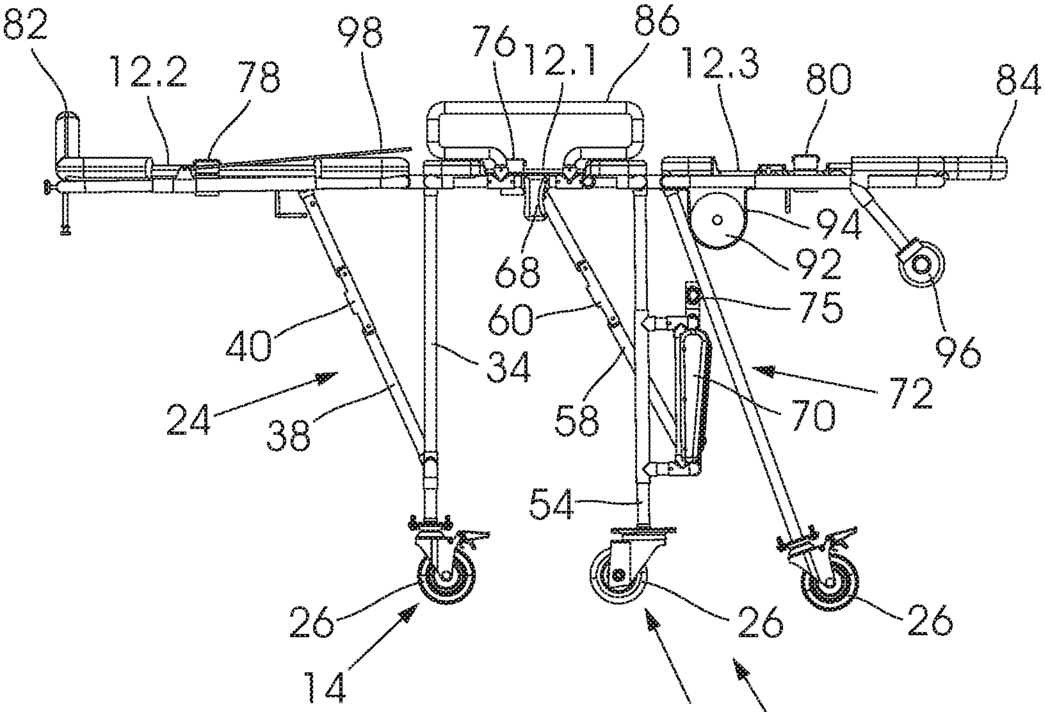
FIG. 19 shows a side view of the patient transport apparatus of FIG. 16 in the first configuration.

As is best shown in FIG. 18, the first wheel subframe 24 comprises two main support members 34 which, at one end thereof, are fixed to the main support frame 18.1 via the first subframe pivot member 30. At a second end, the two main support members 34 are interconnected by a cross member 36, which extends beyond the width of the two main support members 34. A brace member 38 comprising a pivot arrangement 40 extends between the cross member 36 and a first support cross member 42 of the first support frame 18.2. The brace member 38 is pivotably connected to the cross member 36 and the support cross member 42, by means of a first pivot T-member 44 and a second pivot T-member 46, respectively.

Figure 22:
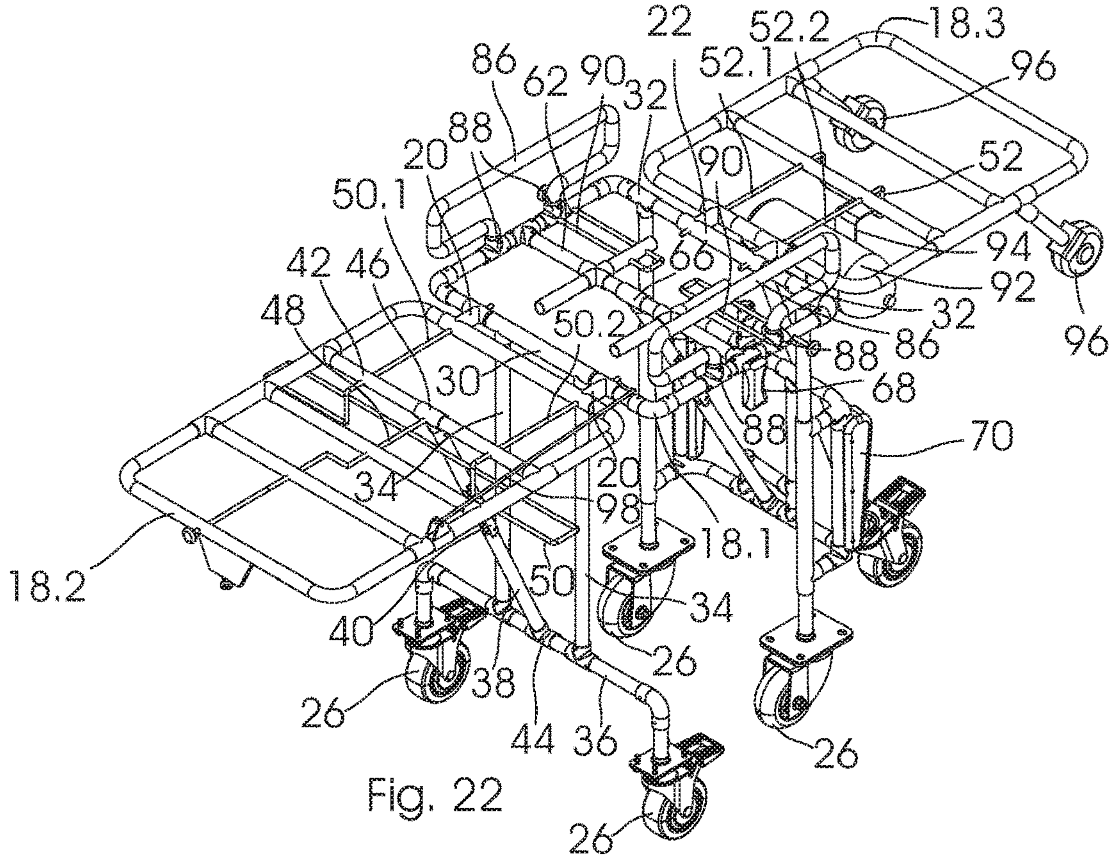
FIG. 22 shows a front top perspective view of the patient transport apparatus of FIG. 16, from which a patient support surface has been removed in order better to show detail of the patient transport apparatus, and particularly support frames, lock mechanisms, and wheel subframes of the patient transport apparatus.
Figure 23:
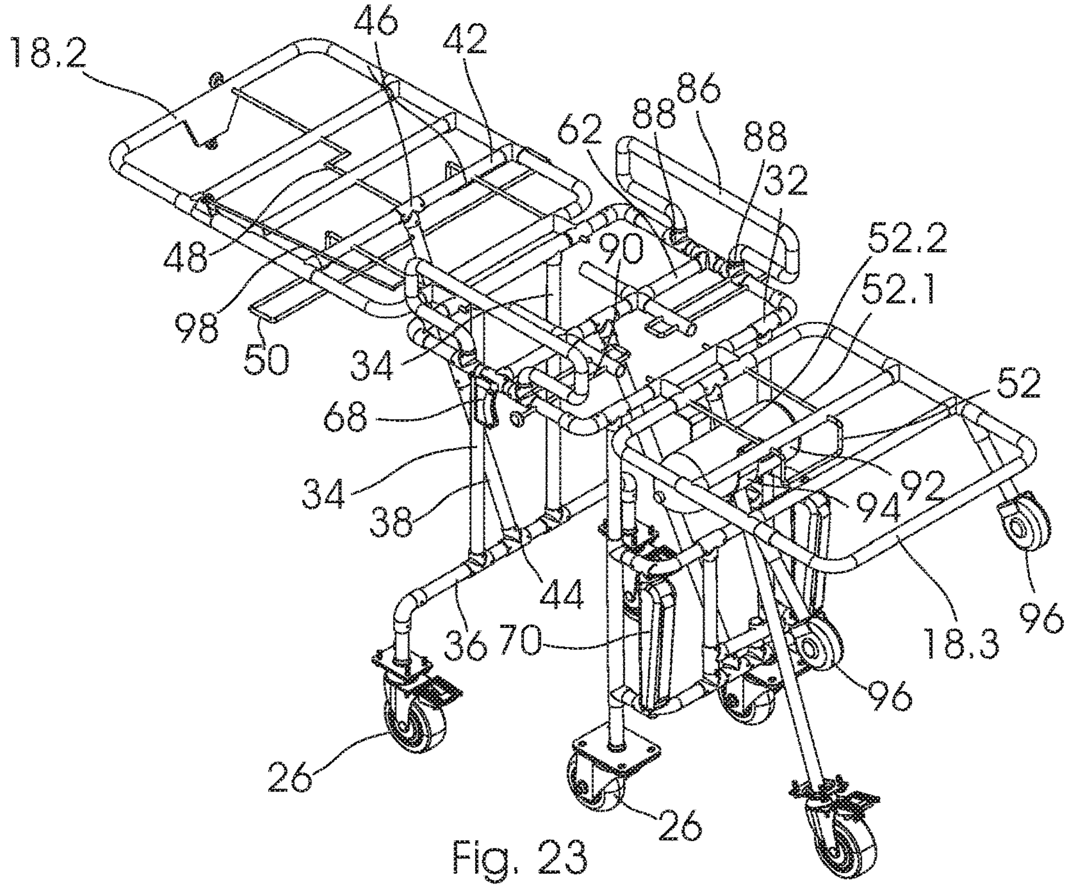
FIG. 23 shows a rear top perspective view of the patient transport apparatus of FIG. 16, with similar components removed therefrom as in FIG. 22.
Figure 24:
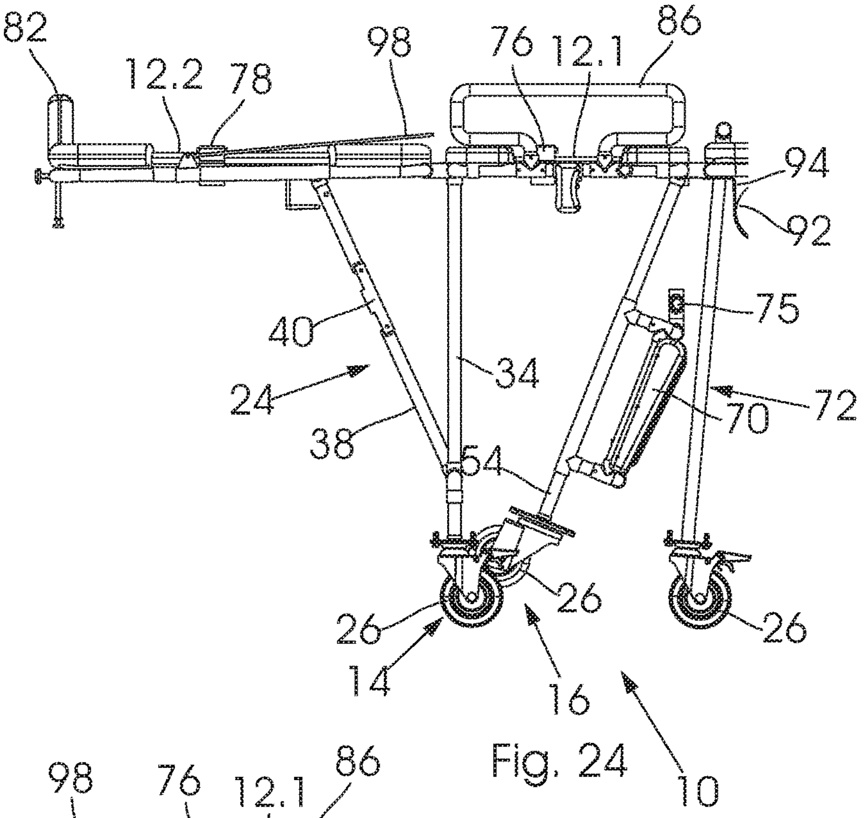
FIG. 24 shows a side view of a front portion of the patient transport apparatus of FIG. 16, wherein a second wheel arrangement has been pivoted from an unfolded configuration, which is shown in FIGS. 16 to 23, in the direction of a folded configuration, and towards an intermediate configuration.
Figure 25:
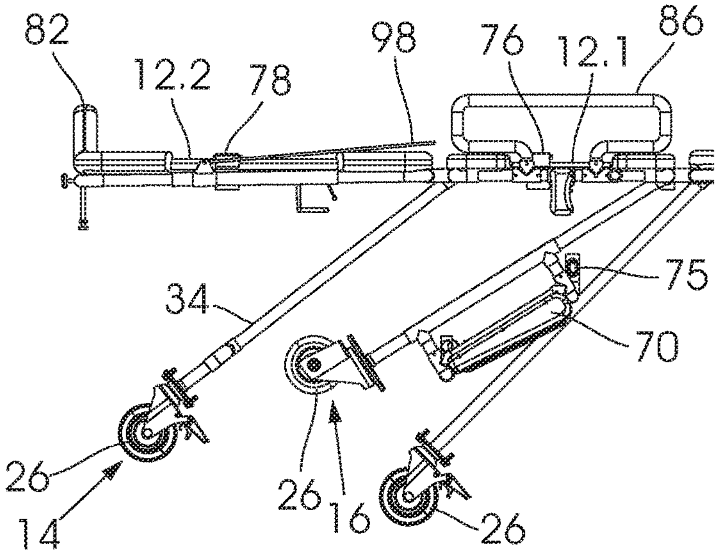
FIG. 25 shows a side view of a front portion of the patient transport apparatus of FIG. 16, wherein a first and second wheel arrangements have been pivoted from an unfolded configuration, which is shown in FIGS. 16 to 23, in the direction of a folded configuration.
Figure 26:
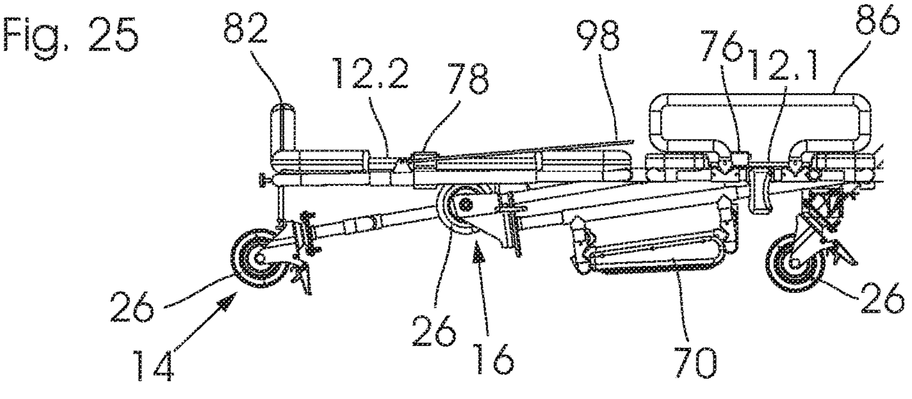
FIG. 26 shows a side view of a front portion of the patient transport apparatus of FIG. 16, wherein the first and second wheel arrangements have been pivoted to the folded configuration.
Figure 27:
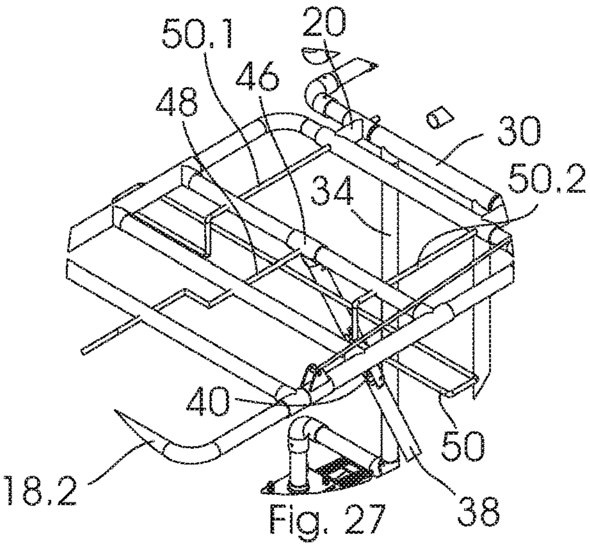
FIG. 27 shows a detailed perspective view of a first support frame and a first and second locking arrangement of the patient transport apparatus of FIG. 16.
Figure 28:
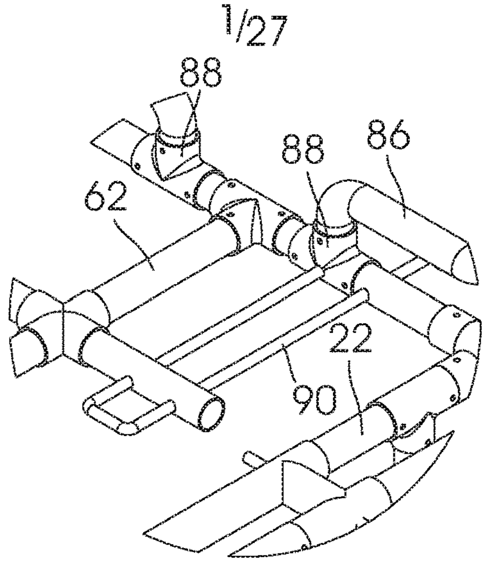
FIG. 28 shows a detailed perspective view of an arm rest lock member of the patient transport apparatus of FIG. 16.
Figure 29:
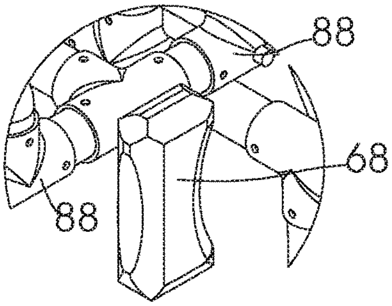
FIG. 29 shows a detailed perspective view of a fourth locking arrangement of the patient transport apparatus of FIG. 16.
Figure 30:
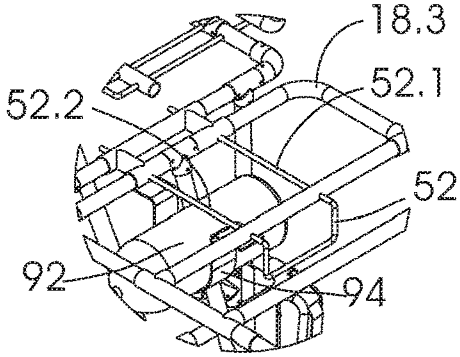
FIG. 30 shows a detailed perspective view of a third locking arrangement of the patient transport apparatus of FIG. 16.

Also, as shown in FIGS. 22 and 27, the first wheel arrangement 14 comprises a first locking arrangement 48, while the first support frame 18.2 comprises a second locking arrangement 50.

The first locking arrangement 48 is provided for inhibiting pivoting movement of the second pivot T-member 46 relative to the first support cross member 42. The first locking arrangement 48 comprises a rod which, when in a locked configuration, is received through an opening through the second pivot T-member 46, thereby inhibiting pivoting movement thereof.

The second locking arrangement 50 is provided for inhibiting pivoting of first support frame 18.2 relative to main support frame 18.1 and comprises two parallel rod sections (designated by reference numerals 50.1 and 50.2). When the second locking arrangement 50 is provided in a locked configuration, the two parallel rod sections (50.1 and 50.2) are received in openings extending through the first pivot members 20, thereby inhibiting pivoting thereof.

Various configurations of the apparatus 10 can be achieved by configuring the first and second locking mechanisms in various combinations. For example, when both the first and second locking arrangements (48 and 50) are in a locked configuration, the main support frame 18.1 and the first support frame 18.2 (and therefore the main portion 12.1 and the first portion 12.2 of the patient support surface) are aligned.

When the first locking arrangement 48 is in an unlocked configuration, and the second locking arrangement 50 is in the locked configuration, the first wheel arrangement 14 can be configured in the folded position, such as when loaded into an ambulance.

Figure 20:
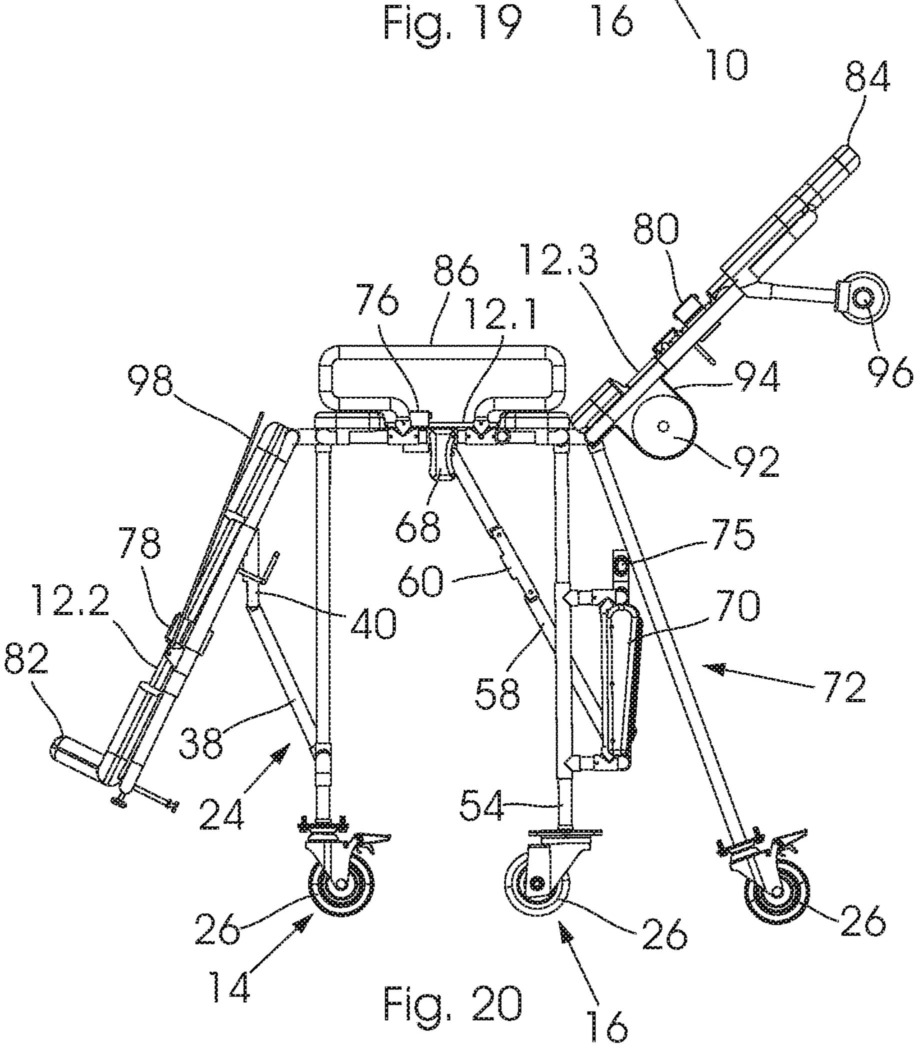
FIG. 20 shows a side view of the patient transport apparatus of FIG. 16 in a second configuration in which the patient transport apparatus is configured as a wheelchair.
Figure 21:
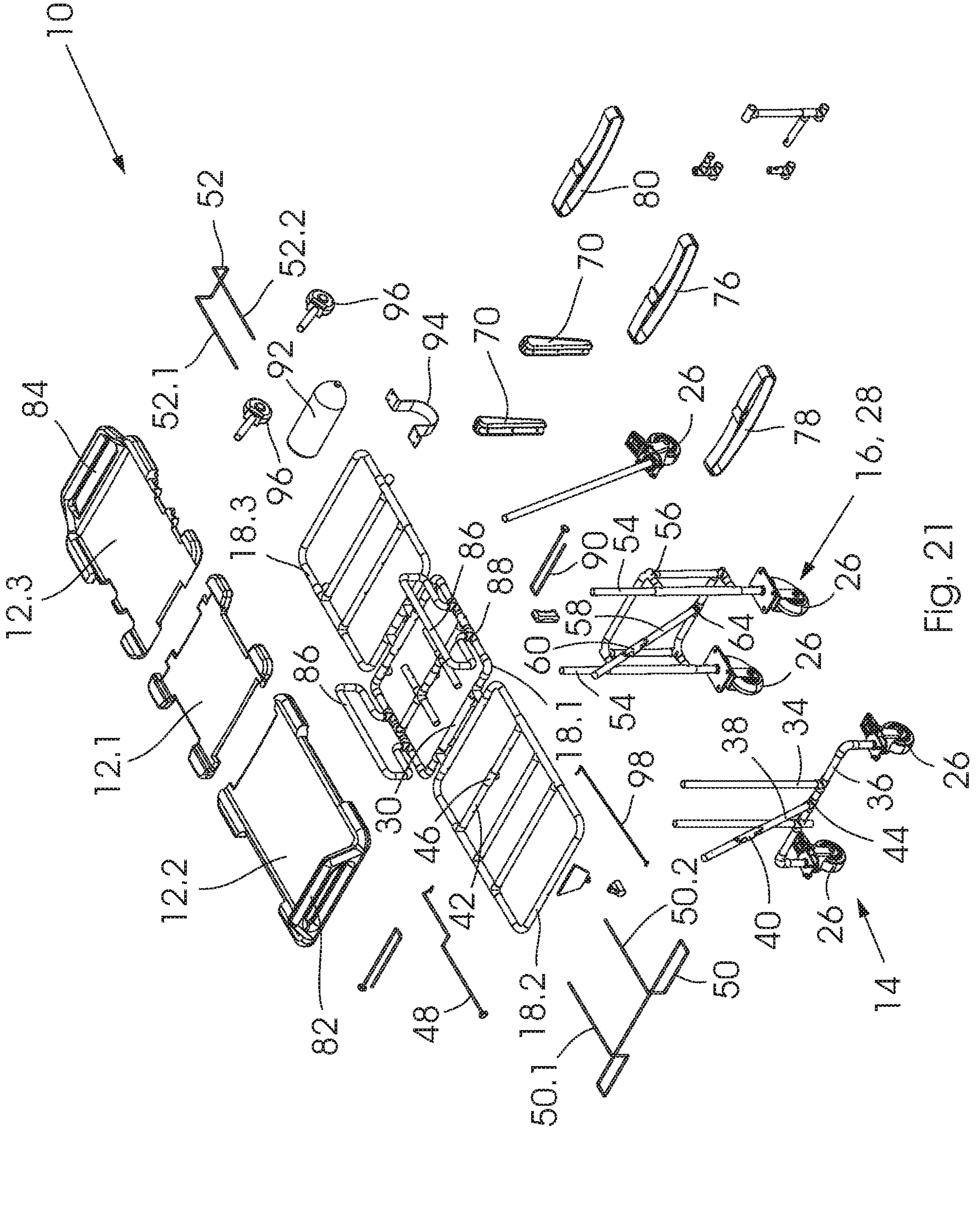
FIG. 21 shows a n exploded top perspective view of the patient transport apparatus of FIG. 16.

When the first locking arrangement 48 is in the locked configuration, and the second locking arrangement 50 is in the unlocked configuration, the first support portion may be pivoted downward, such as when the apparatus 10 is configured as a wheelchair. This is facilitated by pivot arrangement 40 (as can be seen in FIG. 20).

A third locking arrangement 52, having two parallel rod sections (designated by reference numerals 52.1 and 52.2 respectively) is provided for locking the second support frame 18.3 relative to the main support frame 18.1. Again, the first and second parallel rod sections (52.1 and 52.2) extend through the second pivot member 22 when in the locked position. Provision is made for locking the second support frame 18.3 at various inclinations relative to the main support frame 18.1, to support the upper body of the patient at various angles, such as a flat angle (when the apparatus 10 is configured as a stretcher) and an upright angle (which may be between 45 degrees and 90 degrees relative to the main support frame 18.1) when the apparatus is configured as a wheelchair or a stair chair.

The second wheel subframe 28 comprises two main support members 54, connected pivotably to the main support frame 18.1 via the second subframe pivot members 32. The main support members 54 are interconnected by a stair engagement frame 56. A second brace member 58 having a second pivot arrangement 40 extends between a support member of the stair engagement frame 56 and a cross member 62 of the main support frame 18.1. The second brace member 58 is pivotably fixed to the support member of the stair engagement frame 56 via a third pivot T-member 64 and to the member 62 of the main support frame 18.1 via a fourth pivot T-member 66.

A fourth locking arrangement 68 extends inside the cross member 62, and is provided, when arranged in a locked configuration, for locking the second wheel subframe 28 in the unfolded configuration.

The apparatus 10 comprises a stair engagement device 70 (which is essentially similar to the stair engagement device described above in respect of the first example embodiment), which is fitted to the stair engagement frame 56. It will be understood that the stair engagement device 70 is arranged at a predetermined angle when the second wheel subframe 28 is held in the intermediate configuration.

The wheels 26 of the first wheel arrangement 14 are spaced apart by a greater distance than the wheels 26 of the second wheel arrangement 16, to prevent interference with the wheels of the first and second wheel arrangements (14, 16) when the second wheel arrangement 16 is configured in the intermediate configuration, or when both the first and second wheel arrangements (14, 16) are in the folded configurations.

The apparatus 10 comprises a stabiliser wheel arrangement 72 extending in a direction away from the second wheel arrangement 16. The stabiliser wheel arrangement 72 comprises a stabiliser wheel frame and a caster.

A connecting member 74 is provided between the second wheel subframe 28, and more particularly the stair engagement frame 56 and the stabiliser wheel arrangement 72 for releasably locking the second wheel arrangement 16 and the stabiliser wheel arrangement 72 together, when the second wheel arrangement 16 is in the unfolded configuration.

Figure 32:
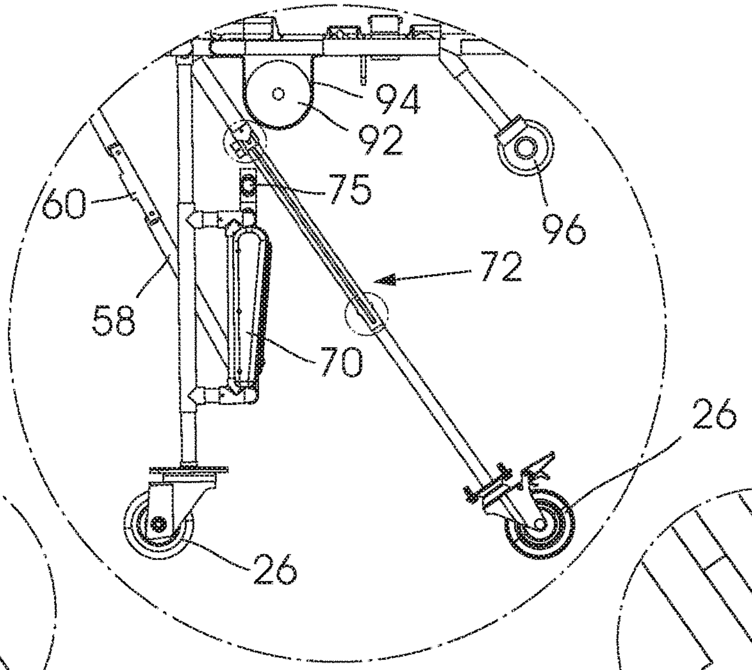
FIG. 32 shows a partial side view of the patient transport apparatus of FIG. 16, configured as a stretcher.
Figure 33:
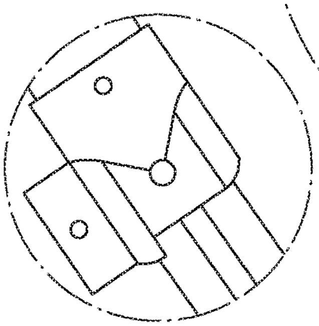
FIG. 33 shows a detailed view of a part of a telescopic stabilizer wheel arrangement of the patient transport apparatus of FIG. 16.
Figure 34:
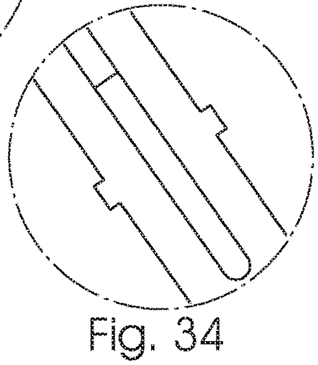
FIG. 34 shows a detailed view of a part of a telescopic stabilizer wheel arrangement of the patient transport apparatus of FIG. 16.
Figure 35:
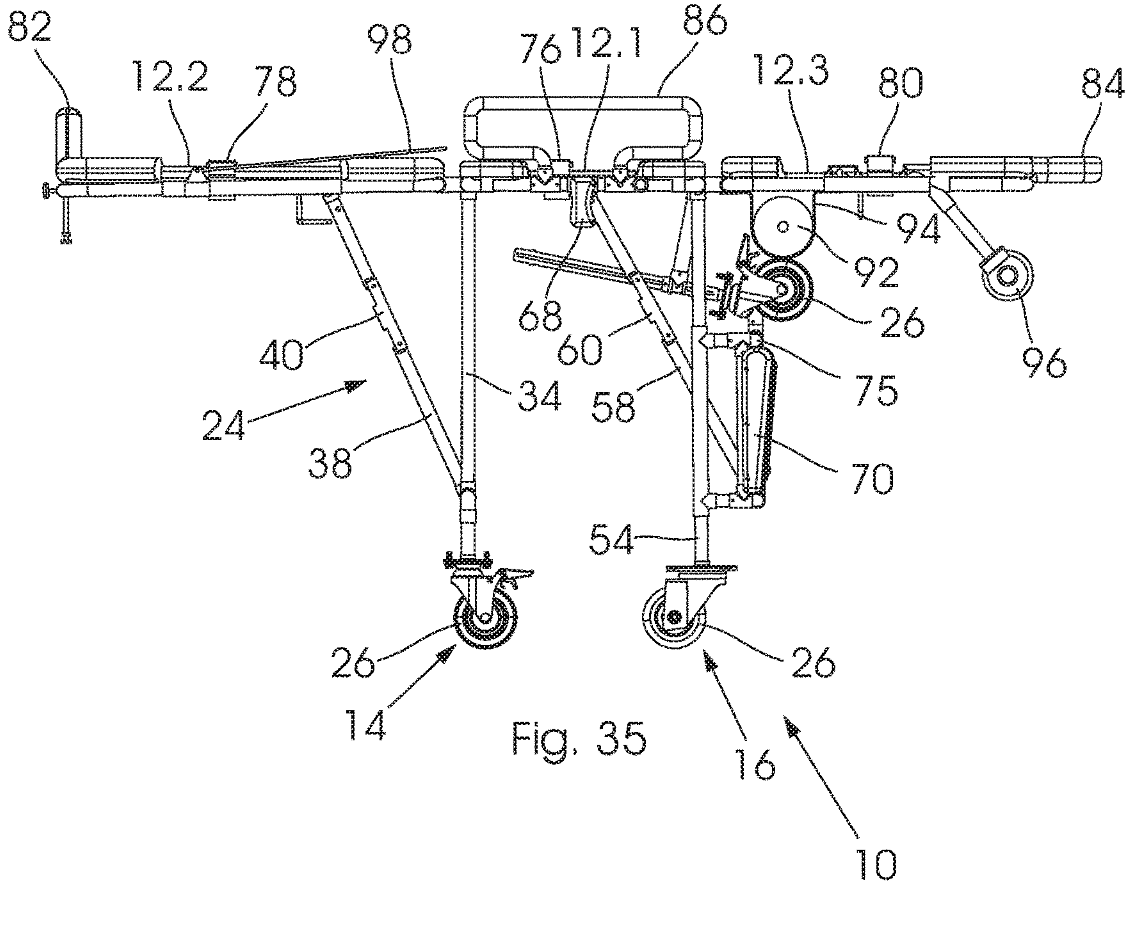
FIG. 35 shows a side view of the patient transport apparatus of FIG. 16, in which a length of the stabilizer wheel arrangement has been reduced.
Figure 36:
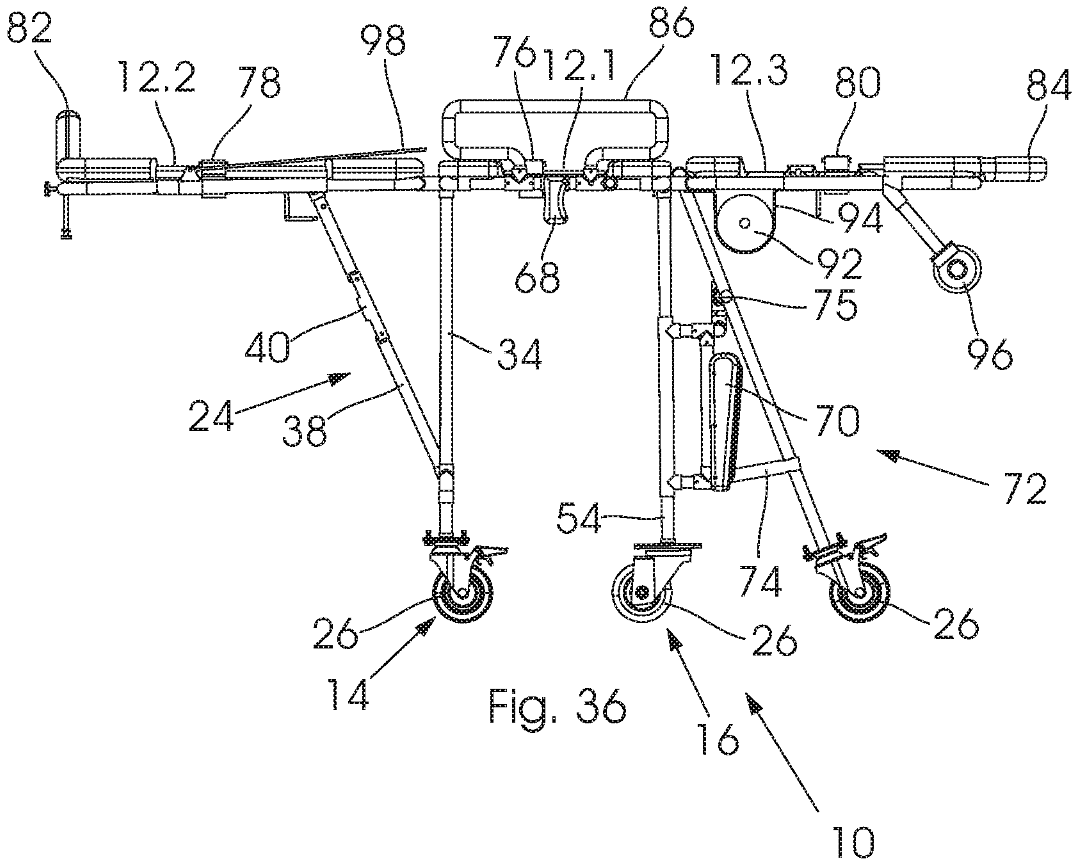
FIG. 36 shows a side view of the patient transport apparatus of FIG. 16, configured as a stretcher, and in which a connecting member is used to fix a position of a stabilizer wheel arrangement relative to a second wheel arrangement.

As is best illustrated in FIGS. 32 to 34, the stabilizer wheel frame is telescopic and is provided for performing various functions. Firstly, the stabilizer wheel arrangement 72 balances out the stretcher and wheelchair when in motion. The connecting member 74 is now used to lock the stabilizer wheel arrangement 72 in place (as best shown in FIG. 36).

Furthermore, while the second wheel arrangement 16 is pivoted towards the intermediate position, but before apparatus 10 is supported on the stairs by the stair engagement device 70, the rear end of the device 10 is supported and held up by the stabilizer wheel arrangement 72. This is shown best in FIG. 37.

Figure 31:
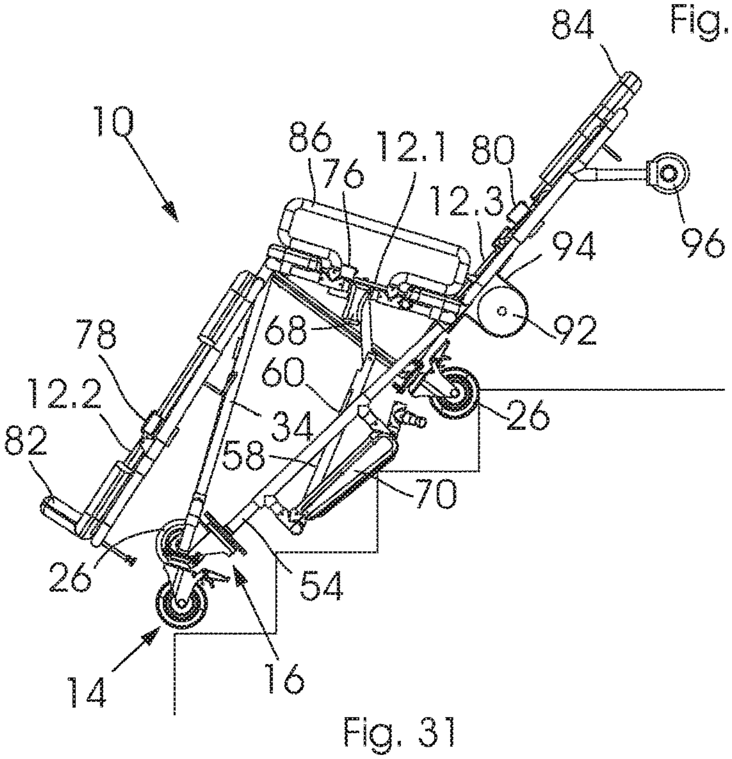
FIG. 31 shows a side view of the patient transport apparatus of FIG. 16, configured as a stair chair, and in use, travelling down a stairway.

Since the frame is telescopic, the length of the stabilizer wheel arrangement 72 can be adjusted as required. When the apparatus 10 is configured as a stair chair and located on a stair as shown in FIG. 31, the length of the stabilizer wheel arrangement 72 is reduced and the stabilizer wheel arrangement 72 is pivoted to provide support for the apparatus on the stair and while moving down the stairs.

Therefore, the stabilizer wheel arrangement 72 is adjustable to enable it to support the apparatus 10 at varying heights while in a stretcher configuration, and also at various angles, such as when in the stair chair configuration.

Figure 37:
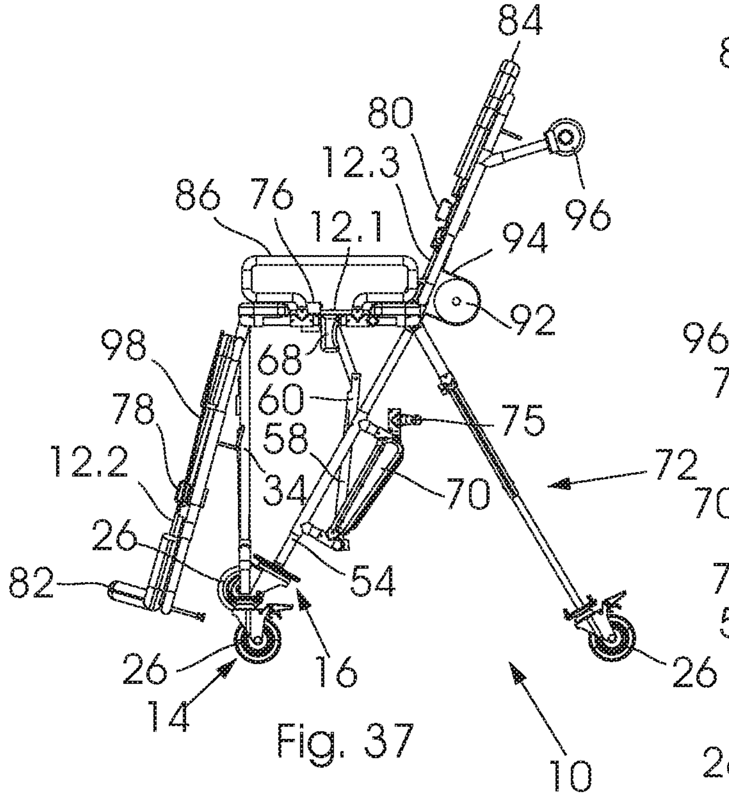
FIG. 37 shows a side view of the patient transport apparatus of FIG. 16, configured as a chair, in which the second wheel arrangement is configured in an intermediate position, and wherein the stabiliser wheel arrangement provides support for a rear portion of the patient transport arrangement.

The telescopic leg is attached by means of a larger T-joint, which is located on the main support frame 12.1 over the second pivot member 22. The telescopic leg is pivotable but locked in place by the castor or by the connection on the second wheel arrangement 16, as seen in FIG. 36 or 37 respectively, depending on the movement required.

Figure 38:
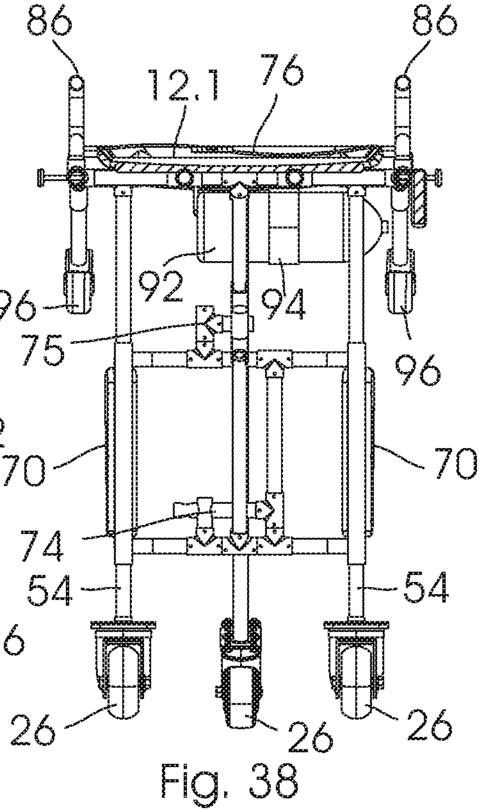
FIG. 38 shows sectioned front view of the patient transport apparatus of FIG. 16, showing detail of the connecting member.

The connecting member 74 is pivotably fixed to the stair engagement frame 56. This is best illustrated in FIG. 38. Therefore, when needed, the connecting member 74 can be pivoted to an operative position (as shown in FIG. 36) to connect the stabilizer wheel arrangement 72 and the second wheel arrangement 16. When no longer required, the connecting member 74 can be pivoted away.

A locking clip 75 is also provided, to perform a similar function as the connecting member 74, but in instances where the length of the stabilizer wheel arrangement 72 has been shortened.

In some cases, such as in the second example embodiment of the apparatus 10, support caster wheels 96 are provided, which are not fixed relative to the main portion 12.1. These support caster wheels 96 are also provided for facilitating loading the apparatus 10 into an ambulance (in cases where the apparatus 10 is configured in a stretcher configuration). It will be understood that, in cases where the second support frame 18.3 is pivoted upwards, such as when the apparatus is configured in the Fowler position, the support caster wheels 96 will no longer be able to facilitate the loading of the apparatus 10 into the ambulance. In such cases the stabilizer wheel arrangement 72 may be adjusted to facilitate the loading of the apparatus 10 into the ambulance.

It will be appreciated that the spacing of the wheels 26 of the apparatus 100 are not similar to that of the apparatus 10 and as mentioned above. Specifically, due to the use of the stair engagement subframe 108, the second wheel arrangement 16 of the apparatus 100 need not be configured in an intermediate configuration when the apparatus 100 is configured in the third configuration. Therefore, no interference between the first and second wheel arrangements (14, 16) of the apparatus 100 occurs. Furthermore, since the second wheel arrangement 16 of the apparatus 100 remains in position when the apparatus 100 is configured in the third configuration, the apparatus 100 does not require a stabiliser wheel arrangement 72.

It will be appreciated that, since the first and second wheel subframes (24, 28) are both pivotably fixed to the main support frame 18.1, the apparatuses (100, 10), when configured as a wheelchair, are very compact, and therefore facilitates easy manoeuvring through small corridors and around corners.

The apparatuses (100, 10) may be used in a wide number of applications, due to its ability to be used as EMS apparatuses, and also due to its ability to be configured in the various configurations as discussed. The construction of the apparatus is furthermore lightweight, adding to the ease of manoeuvrability, in use.

Furthermore, since the apparatus is easily configurable between the various configurations, the apparatus 100 may be used to transport a patient in various positions and over different types of terrain, and still be used as an EMS apparatus, supporting a patient whilst being transported by ambulance. Since various wheels or casters are provided, some of which are also adjustable, the apparatus may support the patient in the Fowlers position, even when located inside an ambulance.

The first and second wheel arrangements (14, 16) are splayed relative to each other when in the unfolded configuration, to improve stability of the apparatus 100.

It will be appreciated that the inclusion of the pivotable stair engagement subframe 108 (in the case of the first example embodiment 100) provides an ergonomic advantage over the configuration of the second example embodiment 10, since the patient support assembly 12 is now generally supported higher relative to the stairs, which eases manoeuvring of the apparatus 100 by a paramedic or operator. That said, the configuration of the second embodiment 10 still provides a useful alternative solution.

It will be appreciated that the above description only provides example embodiments of the invention and that there may be many variations without departing from the spirit and/or the scope of the invention. It will easily be understood from the present application that the particular features of the present invention, as generally described and illustrated in the figures, can be arranged, and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A patient transport apparatus comprising:

a patient support assembly, having a main portion, and a first and second portion extending from opposite sides of the main portion, which first and second portions are independently adjustable relative to the main portion; and at least a first and second wheel arrangement which are adjustable relative to the patient support assembly, wherein the patient transport apparatus is configurable in at least a first configuration, a second configuration and a third configuration, by adjustment of at least some of the first portion, the second portion, the first wheel arrangement and the second wheel arrangement, and wherein the patient transport apparatus is configured: i) as a stretcher when configured in the first configuration; ii) as a chair when configured in the second configuration; and iii) as a stair chair when configured in the third configuration, wherein the patient transport apparatus further comprises:

at least a first stair engagement device which is operatively configured in a position to engage a stair when the patient transport apparatus is configured in the third configuration, the first stair engagement device being fitted to a stair engagement subframe, which in turn, is fitted to the second wheel arrangement which includes a second wheel subframe, wherein the stair engagement subframe is pivotably fixed to a bottom portion of the second wheel subframe, and wherein the stair engagement subframe is pivotably displaceable between a folded configuration and an operative configuration; and a brace extending between the second wheel subframe and the stair engagement subframe when the stair engagement subframe is configured in the operative configuration, for supporting the stair engagement subframe in the operative configuration, wherein a part of the brace is received within a slot formed on the stair engagement subframe, and wherein the brace biases the stair engagement subframe towards the operative configuration.

2. The patient transport apparatus according to claim 1, wherein the main portion and first and second portions of the patient support assembly are substantially aligned and supported by the first and second wheel arrangements in a substantially horizontal orientation when the patient transport apparatus is configured in the first configuration.

3. The patient transport apparatus according to claim 1, wherein the first portion is pivoted downward, and the second portion is pivoted upward relative to the main portion, when the patient transport apparatus is configured in the second configuration.

4. The patient transport apparatus according to claim 1, wherein the stair engagement subframe is disposed at an angle of about 35 degrees from vertical, when in the operative configuration.

5. The patient transport apparatus according to claim 1, comprising a torsion spring located between the brace and the second wheel subframe, which torsion spring causes the brace to bias the stair engagement subframe towards the operative configuration.

6. The patient transport apparatus according to claim 1, including a retaining mechanism for releasably retaining the brace when the stair engagement subframe is in the folded configuration.

7. The patient transport apparatus according to claim 1, wherein the second wheel arrangement is displaceable to an intermediate configuration which is between a folded and unfolded configuration, when the patient transport apparatus is configured in the third configuration wherein, when the patient transport apparatus is configured in the third configuration, the first wheel arrangement is configured in an unfolded configuration, such that the second wheel arrangement is inhibited from being displaced beyond the intermediate configuration by interference between the first and second wheel arrangements, and wherein, when the second wheel arrangement is inhibited from being displaced beyond the intermediate configuration, the second wheel arrangement is retained at a predetermined angle, facilitating the main portion of the patient support assembly to be supported in a substantially horizontal configuration when the patient support apparatus is located on stairs.

8. The patient transport apparatus according to claim 7, further comprising a stabiliser wheel arrangement extending in a direction of the second portion of the patient support assembly.

9. The patient transport apparatus according to claim 8, wherein a connecting member extends between the second wheel arrangement and the stabiliser wheel arrangement for releasably locking the second wheel arrangement and the stabiliser wheel arrangement together.

10. The patient transport apparatus according to claim 9, wherein the connecting member is pivotably fixed to the second wheel subframe.

11. The patient transport apparatus according to claim 1, being configurable in a fourth configuration, in which the second portion of the patient support assembly is pivoted upward relative to the main portion of the patient support assembly, while the first portion of the patient support assembly is provided substantially aligned with the main portion of the patient support assembly or pivoted slightly upward relative to the main portion of the patient support assembly, operatively to support a patient in a Fowler's position.

12. The patient transport apparatus according to claim 1, wherein the first wheel arrangement comprises a locking arrangement for locking a position of the first wheel arrangement relative to the main portion of the patient support assembly.

13. The patient transport apparatus according to claim 1, wherein each of the first and second portions of the patient support assembly comprises a respective locking arrangement for locking a position of the first and second portions relative to the main portion of the patient support assembly.

14. The patient transport apparatus according to claim 1, wherein the first portion of the patient support assembly is pivotably displaceable from about 80 degrees below a level of the main portion of the patient support assembly, to about 15 degrees above the level of the patient support assembly and wherein the second portion of the patient support assembly is pivotably displaceable from a level of the main portion of the patient support assembly, to about 90 degrees above the level of the patient support assembly.

15. The patient transport apparatus according to claim 1, wherein the second portion of the patient support assembly is locked at about 65 degrees above a level of the main portion of the patient support assembly and wherein the first portion is pivoted downward between 65 and 80 degrees relative to the main portion when the patient transport apparatus is configured in the third configuration and wherein the first portion is pivoted downward by between 65 and 80 degrees relative to a level of the main portion of the patient support assembly, and the second portion is pivoted upward by between 65 degrees and 90 degrees relative to the level of the main portion of the patient support assembly, when the patient transport apparatus is configured in the second configuration.

16. The patient transport apparatus according to claim 12, wherein the first wheel arrangement, when locked in position by the respective locking arrangement, is locked at an angle of between 60 and 80 degrees relative to a surface on which the apparatus is supported, and wherein the second wheel arrangement, is locked at an angle of between 60 and 80 degrees relative the surface on which the apparatus is supported.

17. The patient transport apparatus according to claim 1, wherein the patient transport apparatus is configured as an emergency medical services (EMS) transport apparatus.

18. The patient transport apparatus according to claim 17, further comprising at least a first patient securing device, for securing the patient relative to the patient support assembly, wherein the first patient securing device comprises a first belt, in use, extending over a mid-section of a body of the patient, thereby securing the patient to the main portion of the patient support assembly and wherein a position of the first belt is adjustable relative to the patient support assembly.

19. The transport apparatus according to claim 17, further comprising a second and third patient securing device, in the form of a second and third belt, in use extending over a lower portion of the body of the patient to secure the patient relative to the first portion of the patient support assembly, and a torso of the patient to secure the patient relative to the second portion of the patient support assembly, respectively.

20. The transport apparatus according to claim 17, further comprising a first and second adjustable arm rest, which are lockable in an upright position relative to the main portion of the patient support assembly.

* * * * *